United States Patent
DelMarco et al.

(10) Patent No.: US 10,274,958 B2
(45) Date of Patent: Apr. 30, 2019

(54) METHOD FOR VISION-AIDED NAVIGATION FOR UNMANNED VEHICLES

(71) Applicant: BAE SYSTEMS INFORMATION AND ELECTRONIC SYSTEMS INTEGRATION INC., Nashua, NH (US)

(72) Inventors: Stephen P. DelMarco, North Andover, MA (US); Victor T. Tom, Bedford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 91 days.

(21) Appl. No.: 15/365,210

(22) Filed: Nov. 30, 2016

(65) Prior Publication Data

US 2017/0329335 A1 Nov. 16, 2017

Related U.S. Application Data

(63) Continuation-in-part of application No. 15/004,029, filed on Jan. 22, 2016.
(Continued)

(51) Int. Cl.
*G05D 1/02* (2006.01)
*G06T 7/30* (2017.01)
(Continued)

(52) U.S. Cl.
CPC .............. *G05D 1/02* (2013.01); *G01C 21/005* (2013.01); *G05D 1/10* (2013.01); *G06F 16/51* (2019.01);
(Continued)

(58) Field of Classification Search
None
See application file for complete search history.

(56) References Cited

U.S. PATENT DOCUMENTS 4,668,982 A * 5/1987 Tinnerino ........... G03F 7/70633
348/129
6,005,977 A * 12/1999 Tanimizu ............. G06K 9/6206
382/141
(Continued)

FOREIGN PATENT DOCUMENTS

WO 2014152254 A2 9/2014

OTHER PUBLICATIONS

Psarakis et al., "An Enhanced Correlation-Based Method for Stereo Correspondence and Sub-Pixel Accuracy", Proc. of Tenth IEEE Inte'l. Conf. on Computer Vision (ICCV '05), 1550-5499/05, Dec. 11-18, 2015, 6 pages. (Year: 2015).*
(Continued)

*Primary Examiner* — Reza Aghevli
(74) *Attorney, Agent, or Firm* — Sand, Sebolt & Wernow LPA; Scott J Asmus

(57) ABSTRACT

A method for vision-aided navigation which utilizes an image registration system to update a navigation control system. One exemplary feature of the method includes the use of Enhanced Phase Correlation techniques to create a reference imagery database and register images against the created database. The method may be operated on a non-transitory computer-readable medium storing a plurality of instructions which when executed by one or more processors causes the one or more processors to perform the method for vision-aided navigation which utilizes an image registration system to update a navigation control system.

20 Claims, 19 Drawing Sheets
(8 of 19 Drawing Sheet(s) Filed in Color)

Related U.S. Application Data

(60) Provisional application No. 62/106,521, filed on Jan. 22, 2015.

(51) Int. Cl.
*G06T 7/70* (2017.01)
*G01C 21/00* (2006.01)
*G05D 1/10* (2006.01)
*G06F 16/51* (2019.01)
*G06T 7/32* (2017.01)
*B64C 39/02* (2006.01)
*G06K 9/52* (2006.01)
*G06F 16/583* (2019.01)

(52) U.S. Cl.
CPC ............ *G06F 16/5838* (2019.01); *G06T 7/30* (2017.01); *G06T 7/32* (2017.01); *G06T 7/70* (2017.01); *B64C 39/024* (2013.01); *G06K 9/52* (2013.01); *G06T 2200/28* (2013.01)

(56) References Cited

U.S. PATENT DOCUMENTS

| | | | |
|---|---|---|---|
| 7,499,775 B2 | 3/2009 | Filippov et al. | |
| 8,355,834 B2 | 1/2013 | Duggan et al. | |
| 8,666,661 B2 | 3/2014 | Higgins | |
| 8,855,846 B2 | 10/2014 | Grzywna | |
| 8,918,230 B2 | 12/2014 | Chen et al. | |
| 2003/0222936 A1* | 12/2003 | Kaneko | B41J 2/2135 347/19 |
| 2011/0046784 A1 | 2/2011 | Anderson | |
| 2012/0106800 A1* | 5/2012 | Khan | G06K 9/00651 382/104 |
| 2012/0194873 A1* | 8/2012 | Fu | H04N 1/3876 358/448 |
| 2012/0194879 A1* | 8/2012 | Fu | H04N 1/047 358/474 |
| 2012/0195523 A1* | 8/2012 | Fu | H04N 1/387 382/294 |
| 2013/0188878 A1* | 7/2013 | Kacenjar | G06T 3/0068 382/209 |
| 2015/0317527 A1 | 11/2015 | Graumann et al. | |
| 2015/0371431 A1* | 12/2015 | Korb | G06T 9/00 382/113 |
| 2016/0018224 A1 | 1/2016 | Isler et al. | |
| 2016/0217577 A1* | 7/2016 | Tom | G06K 9/52 |
| 2016/0334793 A1* | 11/2016 | Celikkol | G01C 21/20 |

OTHER PUBLICATIONS

Yan et al., "Enhanced Robust Phase Correlation Based Sub-Pixel Feature Matching for Target Motion Estimation", Paparoditis et al. (Ed.), IAPRS, vol. XXXVIII, Part 3B, Sep. 1-3, 2010, pp. 76-79 (Year: 2010).*

* cited by examiner

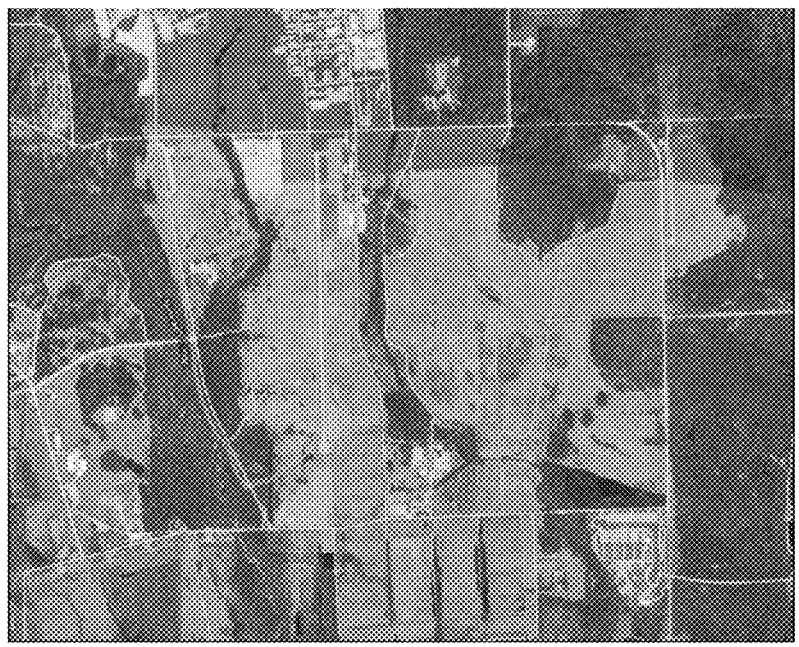
FIG.3E
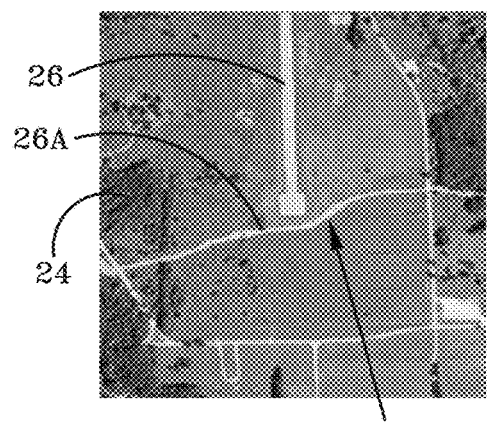 
FIG.3F  FIG.3G

METHOD FOR VISION-AIDED NAVIGATION FOR UNMANNED VEHICLES

CROSS REFERENCE TO RELATED APPLICATIONS

This application is a continuation-in-part patent application of prior copending U.S. patent application Ser. No. 15/004,029, filed Jan. 22, 2016, which application claims the benefit of U.S. Provisional Application Ser. No. 62/106,521, filed on Jan. 22, 2015; the disclosures of which are entirely incorporated herein by reference as if fully rewritten.

STATEMENT OF GOVERNMENT INTEREST

This disclosure was made with United States Government support under Contract No. FA8650-04-C-1675 awarded by the Department of the Air Force. The United States Government has certain rights in this invention.

BACKGROUND OF THE INVENTION

Technical Field

The present disclosure relates generally to navigation. More particularly, the present disclosure relates to navigation of aerial and ground-based vehicles. Specifically, the present disclosure relates to a method for vision-aided navigation which utilizes an image registration system to update navigation control systems.

Background Information

Generally, many technologies exist for autonomous navigation of manned and unmanned aerial and ground-based vehicles. One such example includes GPS-based navigation systems, where navigation of the aerial or ground-based vehicles depends on the Global Positioning System (GPS). While GPS usually provides sufficient accuracy for many aerial and ground-based navigation applications, such systems have some shortcomings.

For example, GPS may not always be available for various reasons. In GPS-denied areas, GPS can be jammed making it unavailable or unreliable for navigation. Even when GPS is available, signal occlusion or multipath effects in urban environments, often referred to as "urban canyons", or in mountainous regions, can degrade GPS accuracy or provide coverage gaps. Further, GPS signals can be weakened by meteorological conditions and by obstructed lines of sight arising from tree canopies, buildings, garages or tunnels. Still further, the accuracy of GPS may be insufficient for autonomous vehicle navigation in some cases.

Another such example is an inertial navigation system (INS) which is a navigation aid that uses a computer, motion sensors (e.g. accelerometers) and rotation sensors (e.g. gyroscopes) to continuously calculate via dead reckoning the position, orientation, and velocity (i.e. direction and speed of movement) of a moving object without the need for external references. Inertial navigation systems typically contain inertial measurement units (IMUs) which have angular and linear accelerometers from which changes in position and orientation can be derived.

An IMU is an electronic device that measures and reports a vehicle's specific force and angular rate through accelerometers and gyroscopes. Some IMUs measure the magnetic field surrounding the vehicle through magnetometers. IMUs are typically used to maneuver aerial and ground-based vehicles and are typically the main component of inertial navigations systems in various aerial and ground-based vehicles.

One drawback of an IMU guidance system is that the system continually adds detected changes to its previously-calculated positions (e.g. via dead reckoning). If there are any errors in measurement, however small, they are accumulated point to point. This leads to IMU 'drift' which is a continually-increasing difference between where the IMU guidance system reports it is located and the actual location of the IMU guidance system.

Autonomous navigation systems typically use an IMU to provide measurements to an INS that integrates vehicle accelerations to determine the vehicle's position. However, 'noise', or any undesired signal, in the accelerometer data leads to vehicle position error in the integrated position solution which can degrade the localization accuracy over time. Although IMU sensors drift over time, they can be used to estimate position over short time periods. The INS estimate of vehicle position is usually updated and corrected by higher accuracy measurements generated by sources outside of the INS. Therefore, there is a need for an improved navigation system.

SUMMARY

Inasmuch as current navigation systems are insufficient in some cases, an improved method for navigation is, therefore, needed. The present disclosure addresses these and other issues by establishing a method for vision-aided navigation which utilizes an image registration system to update navigation control systems.

In one aspect, the disclosure may provide a method for vision-aided navigation comprising: identifying fiducials that persist across multi-temporal imagery and creating a reference imagery database based, at least partially, on the identified fiducials. This embodiment may further include obtaining test imagery from a vehicle and registering the test imagery against reference imagery from the reference imagery database. This embodiment may further include estimating a position error of the vehicle, correcting the position error of the vehicle and guiding the vehicle based, at least partially, on the corrected error position.

In another aspect, the disclosure may provide a method for vision-aided navigation comprising: acquiring an image frame from a sensor on a vehicle including a guidance system and selecting an ortho-rectified reference image from a reference imagery database. This embodiment may further include ortho-rectifying the acquired image frame and geo-registering the ortho-rectified acquired image frame against the ortho-rectified reference image. This embodiment may further include determining the vehicle's positional alignment error, updating the vehicle's guidance system and correcting the vehicle's motion.

In another aspect, the disclosure may provide a non-transitory computer-readable medium storing a plurality of instructions which when executed by one or more processors causes the one or more processors to perform a method for vision-aided navigation, the plurality of instructions for the method for vision-aided navigation comprising: instructions for identifying fiducials that persist across multi-temporal imagery and instructions for creating a reference imagery database based, at least partially, on the identified fiducials. This embodiment may further include instructions for obtaining a test image from a vehicle and instructions for registering the test image against a reference image from the reference imagery database. This embodiment may further include instructions for estimating a position error of the vehicle, instructions for correcting the position error of the vehicle and instructions for guiding the vehicle based, at least partially, on the corrected error position.

In another aspect, the disclosure may provide a method for vision-aided navigation which utilizes an image registration system to update a navigation control system. One exemplary feature of the method includes the use of Enhanced Phase Correlation techniques to create a reference imagery database and register images against the created reference imagery database. The method may be operated on a non-transitory computer-readable medium storing a plurality of instructions which when executed by one or more processors causes the one or more processors to perform the method for vision-aided navigation which utilizes an image registration system to update a navigation control system.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3E is a different ortho-rectified reference video frame image of the scene where the reference video frame image of FIG. 3A was obtained from an aerial video frame;

FIG. 3F is an image patch extracted from the image of FIG. 3A;

FIG. 3G is an image patch extracted from the image of FIG. 3E;

Similar numbers refer to similar parts throughout the drawings.

DETAILED DESCRIPTION

Initially, the Inventors note that the present invention is a continuation-in-part application of U.S. patent application Ser. No. 15/004,029 (the '029 Application) filed on Jan. 22, 2016, the entirety of which is fully incorporated herein as if fully re-written. The present invention touches upon additional subject matter to the aforementioned '029 Application, namely, a method for vision-aided navigation. Since this is a continuation-in-part application of the '029 Application, some similar structural nomenclature is used herein when referencing some portions of the method for vision-aided navigation. However, there may be some instances where structural nomenclature differs between similar elements and there may be other instances where nomenclature is similar between distinct elements relative to this application and the '029 Application.

Figure 1:
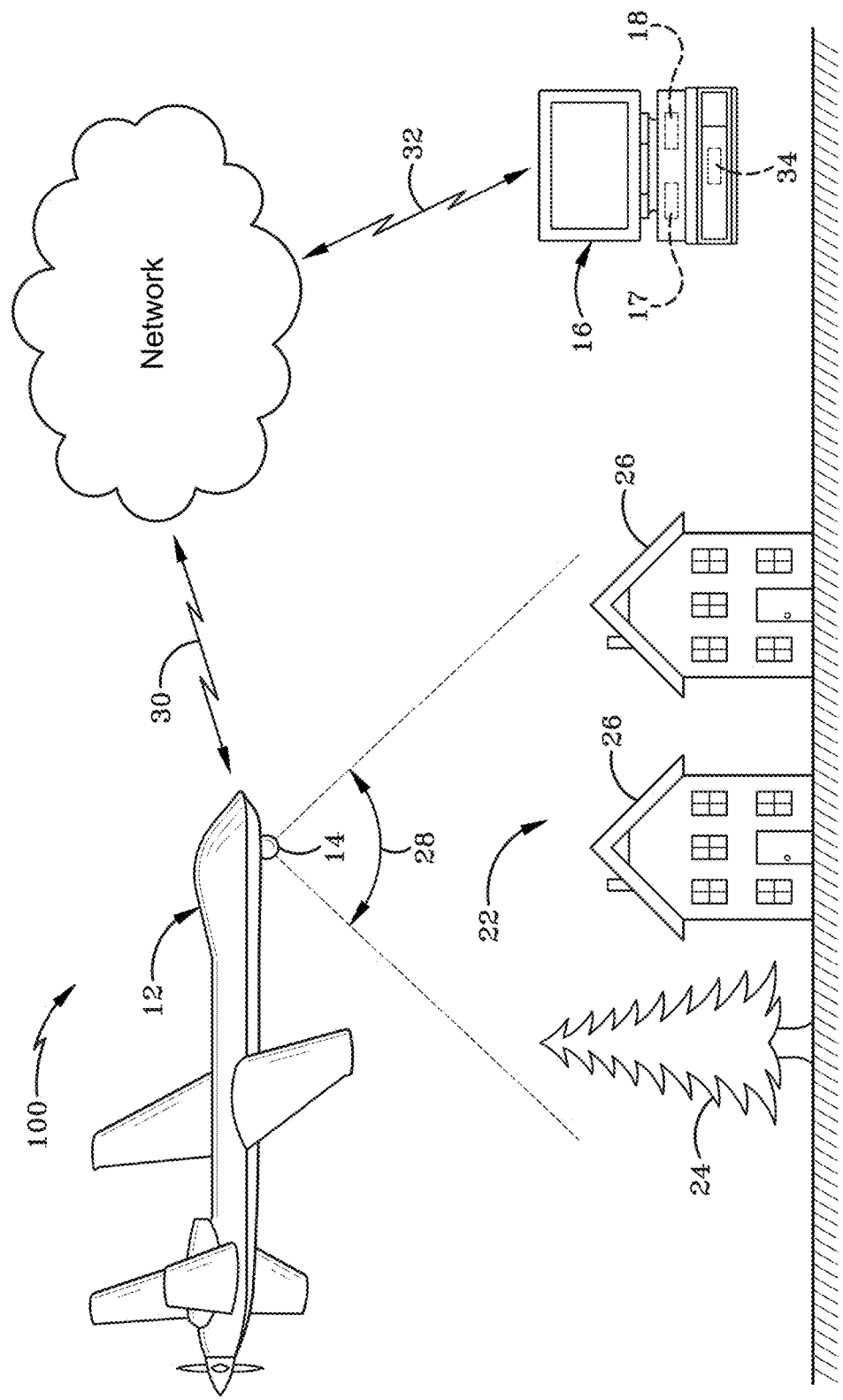
FIG. 1 is a general diagrammatic view of an embodiment of a vision-aided navigation system.

As depicted in FIG. 1, a vision-aided navigation system is broadly depicted as 100. Vision-aided navigation system 100 may include a vehicle 12 carrying a camera 14, a computer 16 operatively coupled to a memory 17 and a processor 18, a network connection 20, and a geographic landscape 22 which may include natural features 24, such as trees, vegetation, or mountains, or manmade features 26, such as buildings, roads, or bridges, etc., which are viewable from vehicle 12 through a viewing angle 28 of camera 14.

In one particular embodiment, vehicle 12 is a flying device configured to move above the geographic landscape 22. Vehicle 12 may be a drone or unmanned aerial vehicle (UAV) as one having ordinary skill in the art would understand. In another example, the vehicle 12 refers to planes, helicopters, zeppelins, balloons, space shuttles, and the like while a further example includes missiles, rockets, guided munitions, and the like. Camera 14 is carried by vehicle 12 and may be selected from a group of known cameras capable of capturing images in a wide variety of electromagnetic spectrum for image registration. For example, camera 14 may capture synthetic aperture radar (SAR), infrared (IR), electro-optical (EO), lidar or light imaging, radar and detection (LIDAR), video, and x-ray imagery, amongst many others as one would easily understand. The camera 14 in one example is powered from the vehicle 12 and in another example the camera has its own power source.

Network 20 allows the transmittal of digital data from camera 14 to processor 18 and memory 17 in computer 16. Network 20 is preferably an encrypted and secure high-speed internet. When camera 14 captures a reference image and a test image, they are sent to network 20 via a first network connection 30. Processor 18 is operatively coupled to network 20 via a second network connection 32. Further, while computer 16 is depicted as remote from vehicle 12, it is entirely possible that computer 16 is carried by vehicle 12 such that the image registration process occurring in memory 17 and processor 18 occurs onboard vehicle 12. In this latter embodiment, the image processing would be performed on the vehicle 12 and the network 20 refers to the internal network within the vehicle 12.

As will be described in greater detail below, the vision-aided navigation system 100 utilizes an image registration system to register reference images and test images. In one particular embodiment, the test image ($I_T$) and the reference image ($I_R$) will be matched (i.e., registered) in processor 18 utilizing an Enhanced Phase Correlation (EPC) process which was disclosed in the '029 Application. To accomplish the image registration, computer 16 and processor 18 may operate in conjunction with memory 17 and a plurality of input/output ports which may be operably connected by a bus.

In one particular embodiment, the computer 16 includes an Enhanced Phase Correlation logic 34 configured to robustly register SAR, infrared IR, EO, video, and x-ray imagery. In different examples, the Enhanced Phase Correlation logic 34 may be implemented in hardware, software, firmware, and/or combinations thereof. Thus, the Enhanced Phase Correlation logic 34 may provide means (e.g., hardware, software, firmware) of registering imagery by performing a hierarchical search and match utilizing the techniques disclosed in the '029 Application.

Computer 16 operates in the network 20 environment and thus may be connected to other network devices (not shown) via the i/o interfaces, and/or the i/o ports. Through the network 20, the computer 16 may be logically connected to other remote computers. Networks with which the computer may interact include, but are not limited to, a local area network (LAN), a wide area network (WAN), and other networks. The networks may be wired and/or wireless networks.

Memory 17 and processor 18 operate collectively to define a non-transitory computer-readable medium storing a plurality of instructions which when executed by one or more processors causes the one or more processors to perform a method for vision-aided navigation utilizing image registration logic. The plurality of instructions for the vision-aided navigation system may include, amongst other things, instructions for running a patch-based matching approach for identifying persistent, discriminating fiducials across multiple, multi-temporal reference imagery that serve as robust landmarks for navigation. The plurality of instructions may include instructions for registering vehicle-acquired imagery to the identified fiducial image patches. The plurality of instructions may include instructions for running an image registration verification metric. The plurality of instructions may include instructions for running a registration positional error covariance. The plurality of instructions may further include instructions for correcting vehicle 12 position.

The next portions of the present disclosure discuss the vision-aided navigation system and detail its results from real-world testing.

Automatic Fiducial Extraction

In one particular embodiment according to the present disclosure, the method for vision-aided navigation 100 utilizes the EPC process to identify fiducial image patches which are persistent across multi-temporal imagery. In one particular embodiment, it is important for robust fiducials to display high discrimination power as well as to be persistent across multi-temporal imagery.

For example, in one particular embodiment, the method 100 compiles reference images acquired from a particular area and/or route of travel. Each reference image is tiled into a set of image patches that cover the entire reference image. Through EPC techniques, the image patches are registered against overlapping reference images collected from the area and/or route of travel. The EPC Verification Metrics (VMs), which is further described below, of the image patches are used to select the fiducial image patches that are placed in a reference imagery database. The fiducial image patches with the highest VMs are selected.

Alternatively, in one particular embodiment, the fiducial image patches are selected by first running standard feature extractors across a reference image. Next, a measure of feature content ranging from low to high is created as one of ordinary skill in the art would understand. The fiducial image patches exhibiting high feature content based on the measure of feature content are selected. Next, through EPC techniques, the selected fiducial image patches are registered against overlapping reference images. The EPC VMs, which is further described below, of the image patches are used to select the fiducial image patches that are placed in a reference imagery database. The fiducial image patches with the highest VMs are selected.

Further, each selected fiducial image patch is embedded or 'tagged' with information associated with its location on the earth. The tagged information includes, but is not limited to, the latitude and longitude coordinates and altitude at which the fiducial image patch was acquired or any other suitable coordinates. The fiducial image patch tagged information locations serve as indices in the reference imagery database. Thus, if an approximate vehicle position is known, geometry is used to determine an approximate ground location as one having ordinary skill in the art would understand. Once the approximate ground location is known, fiducial image patches are selected that are near the approximate ground location.

Figure 2A:
FIG. 2A is an ortho-rectified reference image obtained from an aerial video frame.
Figure 2B:
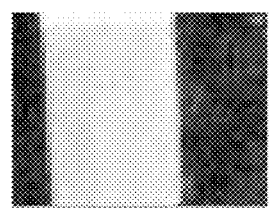
FIG. 2B is an image patch of a portion of a runway displayed in the image of FIG. 2A.
Figure 2C:
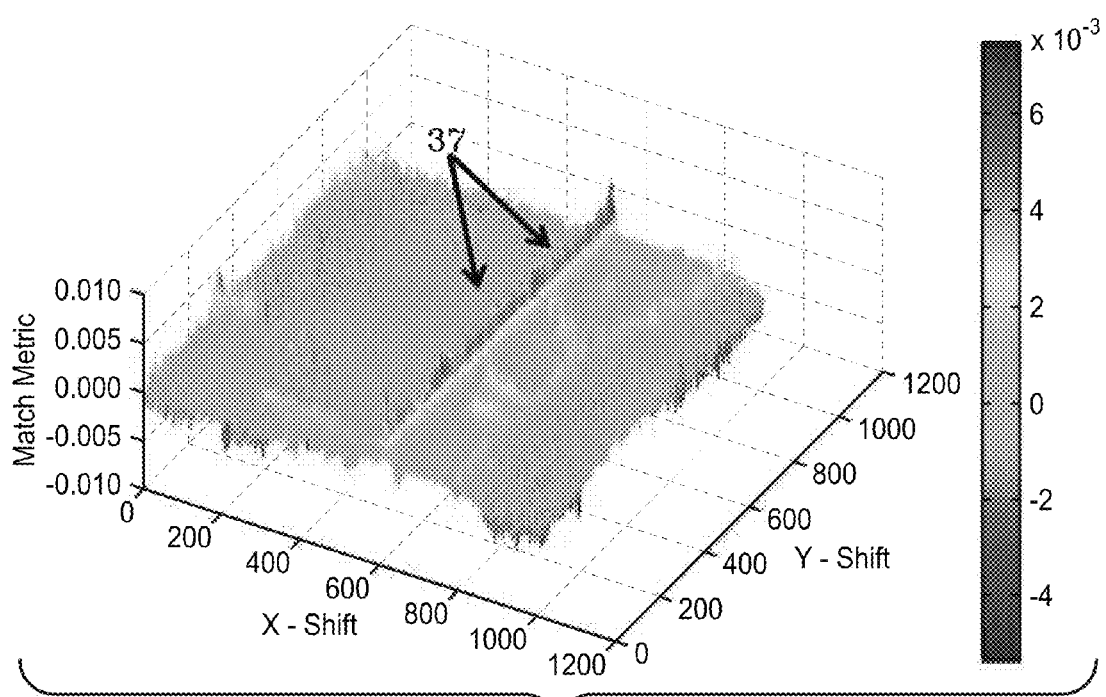
FIG. 2C is a graph depiction of the correlation surface of the Enhanced Phase Correlation registration of the image patch of FIG. 2B and the ortho-rectified reference image of FIG. 2A.

Reference is made to FIG. 2A, which is an ortho-rectified reference image which contains a runway 36. FIG. 2B is a fiducial image patch of a portion of the runway 36; however, the portion of the runway 36 selected for the fiducial image patch is not a portion of the runway 36 contained within the reference image of FIG. 2A. Through EPC, the fiducial image patch of FIG. 2B is correlated against the ortho-rectified reference image of FIG. 2A which produces the EPC correlation surface as shown in FIG. 2C. The EPC correlation surface displays a long narrow ridge 37 along the Y-coordinate direction which indicates feature ambiguity. Feature ambiguity exists because the fiducial image patch of FIG. 2B does not display high discrimination power as the fiducial image patch matches well with almost any section of the runway contained within the reference image.

Recall, the EPC Verification Metric, which was described in greater detail in the '029 Application, was developed for feature-based image registration to provide a confidence value for registration solution verity in the absence of ground truth. The VM technique measures the signal-to-noise ratio of the EPC correlation surface peak to the surrounding area of the peak. The VM becomes equivalent to the peak-to-side lobe ratio defined for the phase correlation surface. Thus, the VM establishes a type of match metric associated with a correlation surface peak value as a way to judge the effectiveness of the image registration.

Further, the VM may have a threshold to make a decision on registration solution verity, however, establishing an appropriate threshold selection can be difficult, depending upon, for example, scene content characteristics, image quality, and seasonal effects. The threshold of the VM may be based on a Z-score normalization of a set or distribution of VM match scores, where the use of a Z-score normalization implicitly assumes a Gaussian statistical model for the VM match scores. The VM threshold is based on the Z-score normalization results and the threshold can be set as needed. Higher VM thresholds generally indicate higher confidence in the correctness of the registration solution. Lower VM thresholds cast doubt on the truth of the solution. Thus, the VM thresholds are set based, in part, on the degree of correctness needed for the particular registration being conducted.

In one embodiment according to the present disclosure, imagery examples are obtained to aid in setting the VM threshold. The selected imagery examples are similar to the imagery that will be registered against reference imagery. For example, if imagery that needs to be registered against reference imagery contains features such as mountains, rivers and trees, the example imagery will contain mountains, rivers and trees. The example imagery is registered against reference imagery and a set of VM scores is obtained. The VM match scores are Z-score normalized and the results of the Z-score normalization are analyzed. The threshold is selected based on the expected spread of the VM match score data and on the degree of correctness required.

Recall, the EPC correlation surface in FIG. 2C demonstrates a wide region of large correlation coefficients which produces a low VM. The low VM indicates that the test image is a poor match with the reference image. Thus, the fiducial image patch of FIG. 2B is deemed an unreliable, inadequate fiducial image patch because the fiducial image patch has insufficient scene content information for reliable registration.

Figure 3A:
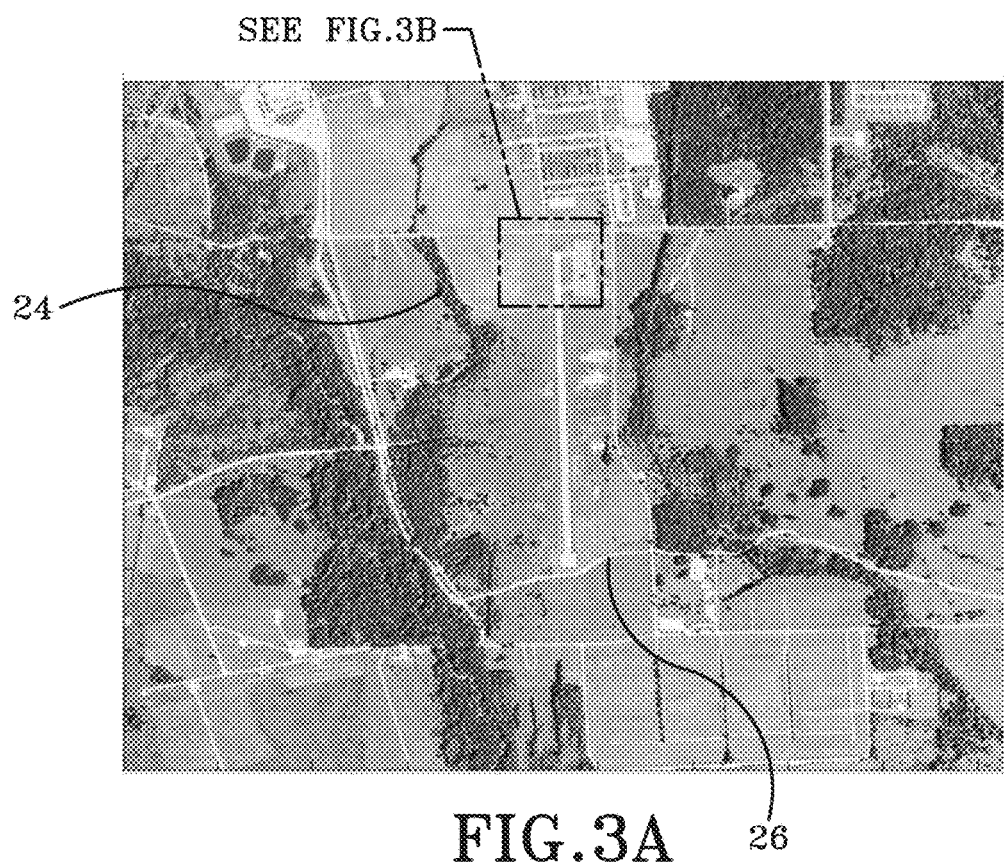
FIG. 3A is an ortho-rectified reference video frame image derived from an aerial video frame.
Figure 3B:
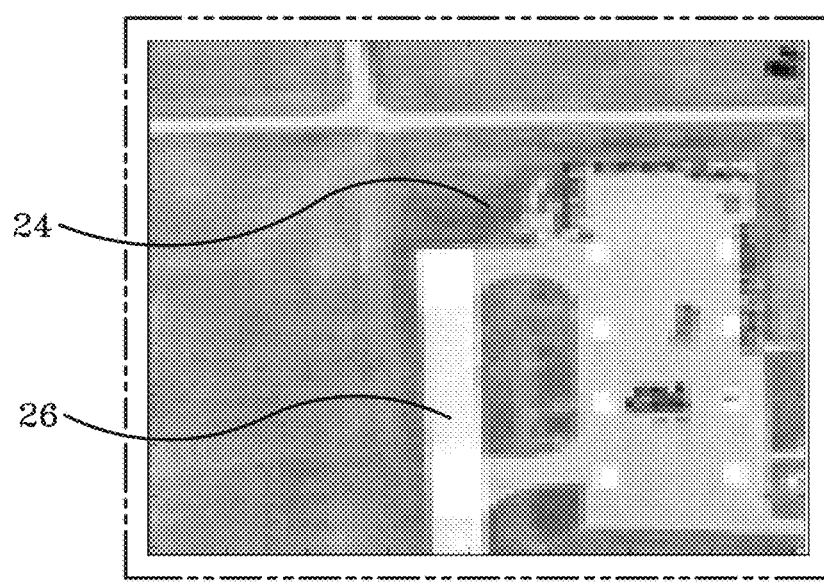
FIG. 3B is an image patch extracted from the image of FIG. 3A.

FIG. 3A is a reference image which contains various roadways 26 and vegetation 24. FIG. 3B is a fiducial image patch of a portion of the reference image of FIG. 3A which contains highly discriminating features (i.e. roadways 26 and vegetation 24). Through EPC, the fiducial image patch of FIG. 3B is correlated against the reference image of FIG. 3A which produces the EPC correlation surface as shown in FIG. 3C.

Figure 3C:
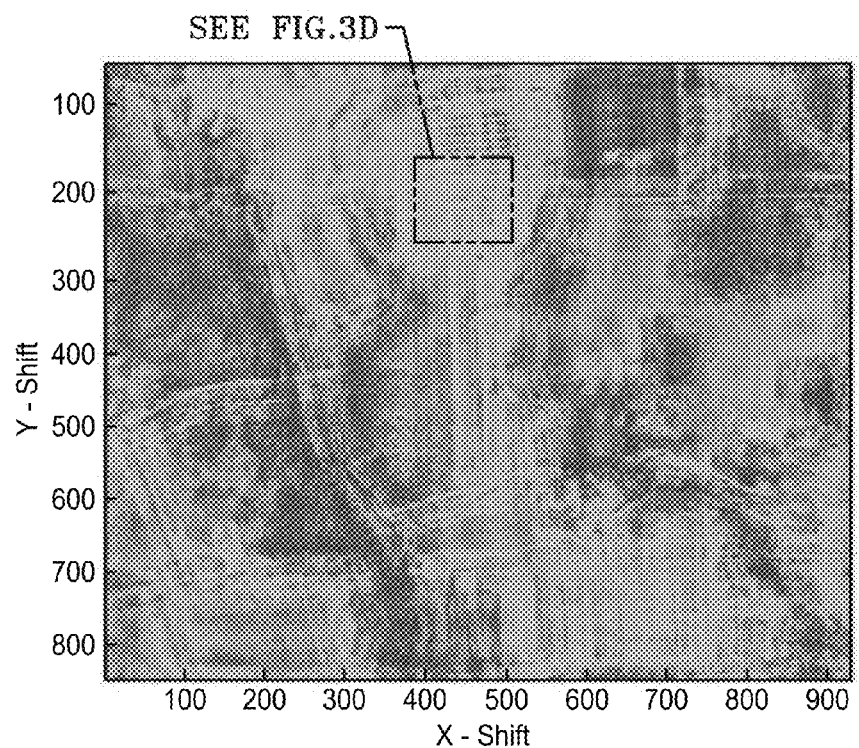
FIG. 3C is a graph depiction of the correlation surface of the Enhanced Phase Correlation registration for a match of the image patch of FIG. 3B to the reference image of FIG. 3A.
Figure 3D:
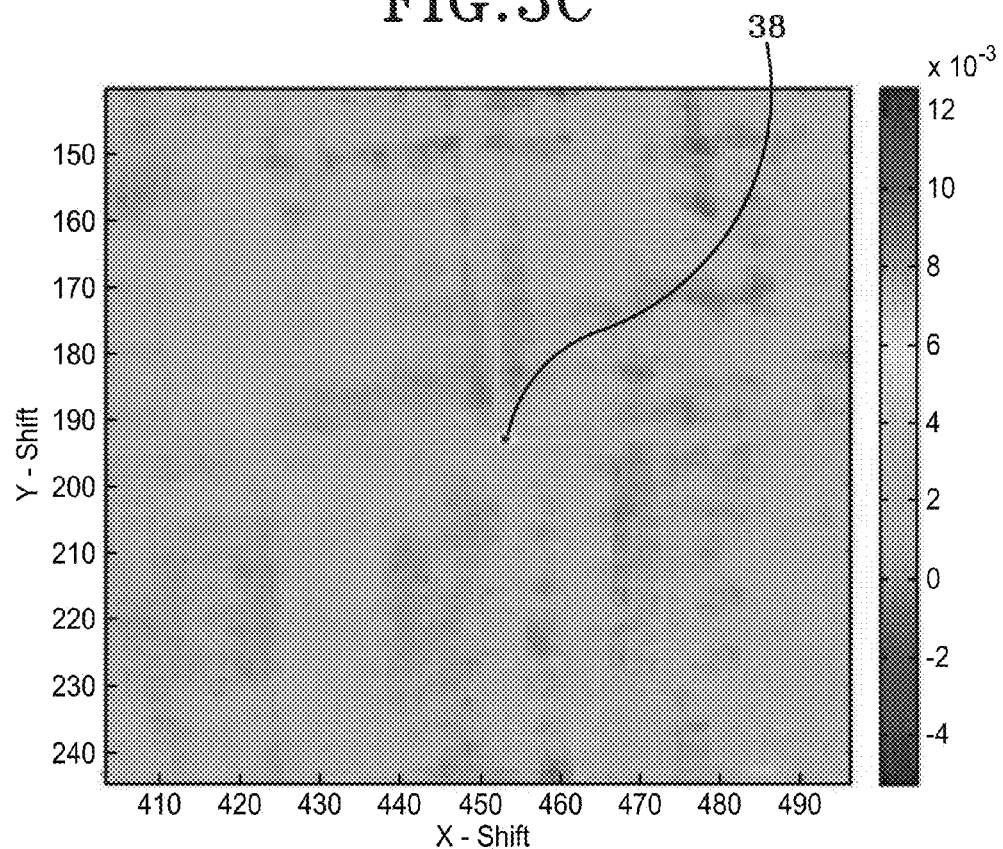
FIG. 3D is an enlarged view of the correlation surface of the Enhanced Phase Correlation registration for a match of the image patch of FIG. 3B to the reference image of FIG. 3A.

The EPC correlation surface of FIG. 3C displays a high narrow correlation peak 38, as shown in the enlarged view of the EPC correlation surface at the correlation peak 38 in FIG. 3D, at the correct registration solution and small values at incorrect positions. The height of the EPC peak 38 helps to reduce confusion with other peaks that may compete with the peak 38 corresponding to the correct solution. The high narrow correlation peak 38 at the correct registration solution indicates that the registration was accurate and that the fiducial image patch of FIG. 3B matches the reference image of FIG. 3A at the correct position. The fiducial image patch of FIG. 3B displays high discrimination power as the fiducial image patch contains sufficiently unique, distinctive information to match the reference image at the correct position. For example, the fiducial image patch of FIG. 3B contains distinctive roadways 26 (i.e. the roadways have sharp edges). Thus, the fiducial image patch of FIG. 3B is deemed a reliable, adequate fiducial image patch due to the fiducial image patch having sufficient scene content information for reliable registration. The above process is repeated until an adequate number of fiducial image patches are selected.

In order for the selected fiducial image patches to be useful, they must persist across multi-temporal imagery. Recall, FIG. 3A is a reference image which contains various roadways 26 and vegetation 24. FIG. 3E is a second reference image of the same scene contained within FIG. 3A acquired across a time difference of years. A comparison of the reference image of FIG. 3A to the second reference image of FIG. 3E shows differences in scene content as described below.

FIG. 3F is an image patch of a portion of the reference image in FIG. 3A. FIG. 3G is an image patch of a portion of the reference image in FIG. 3E. The image patch of FIG. 3F is compared to the image patch of FIG. 3G and the roadway 26A in FIG. 3F shown generally at position A is not present in the image patch of FIG. 3G shown generally at position B. Further, some of the vegetation 24 that is contained within FIG. 3F is not present in the image patch of FIG. 3G.

Figure 3H:
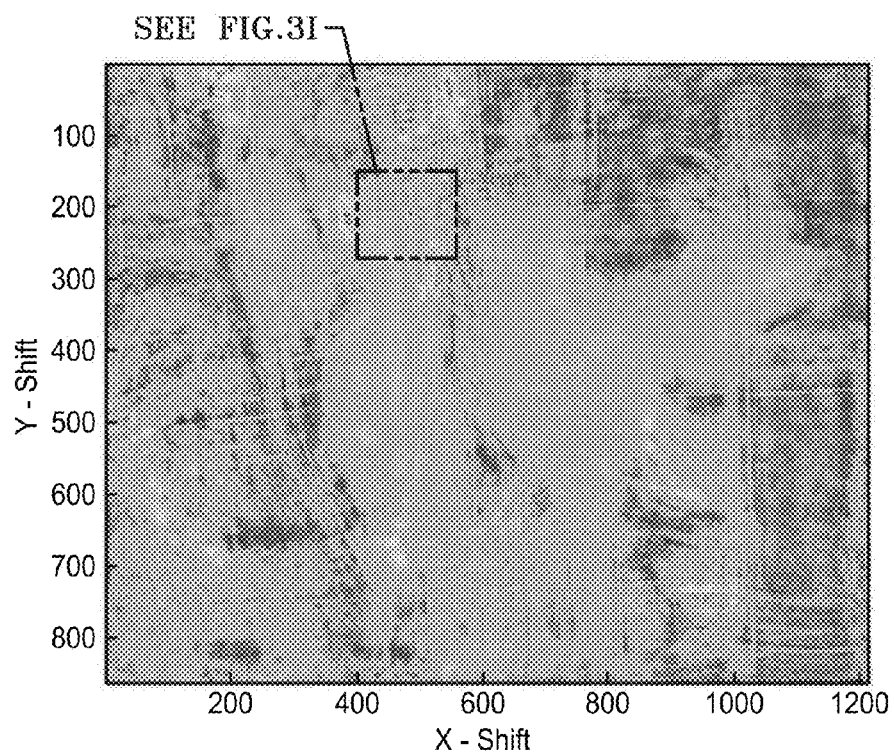
FIG. 3H is the correlation surface of the Enhanced Phase Correlation registration for a match of the image patch of FIG. 3A, shown in FIG. 3B, to the reference image of FIG. 3E.
Figure 3I:
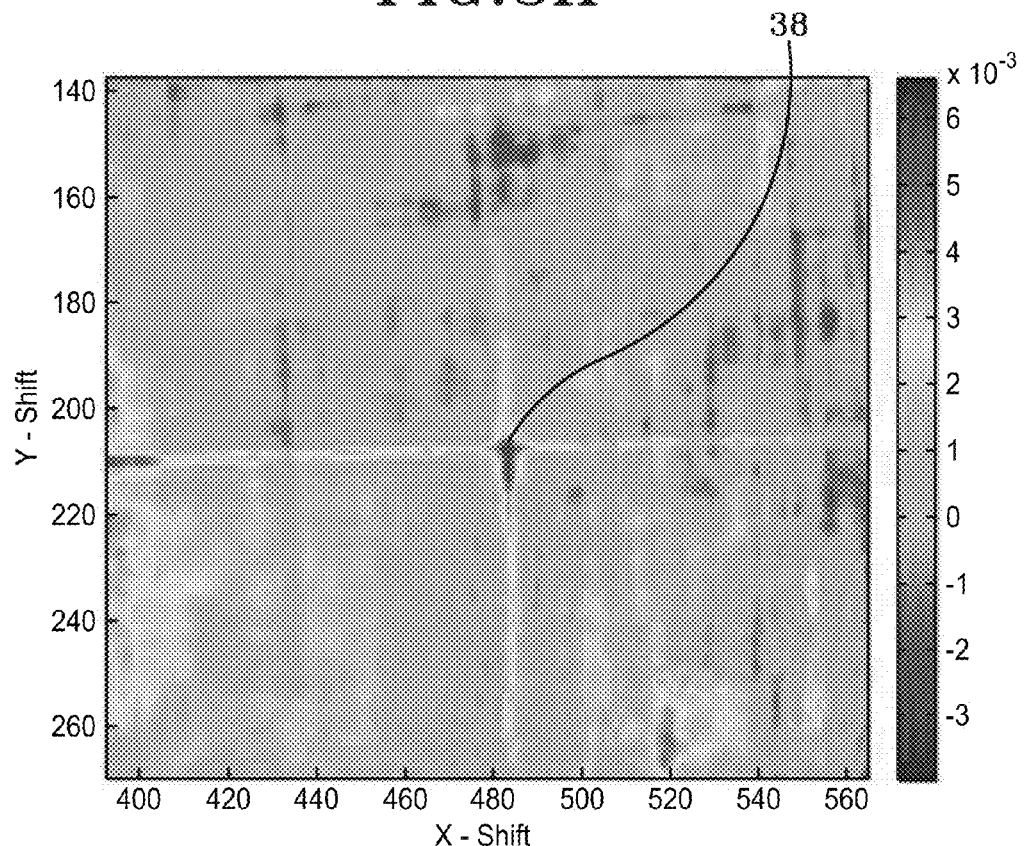
FIG. 3I is an enlarged view of the correlation surface of the Enhanced Phase Correlation registration for a match of the image patch of FIG. 3A, shown in FIG. 3B, to the reference image of FIG. 3E.

Through EPC, the fiducial image patch of FIG. 3B is correlated against the reference image of FIG. 3E which produces the EPC correlation surface as shown in FIG. 3H. The EPC correlation surface displays a high narrow peak 38 at the correct registration solution which means that the fiducial image patch of FIG. 3B matches the reference image of FIG. 3E at the correct position. The height of the EPC correlation peak 38 helps to reduce confusion with other peaks that may compete with the peak corresponding to the correct solution.

Since the fiducial image patch of FIG. 3B successfully matched with the reference image of FIG. 3A and the reference image of FIG. 3E, the fiducial image patch is deemed to be persistent across multi-temporal imagery (i.e. the image patch was successfully registered to the same scene location across a time period of years). Thus, the fiducial image patch of FIG. 3B is deemed a reliable, adequate fiducial image patch due to the fiducial image patch having sufficient scene content information for reliable registration.

Vision-Aided Navigation (1)

Figure 4:
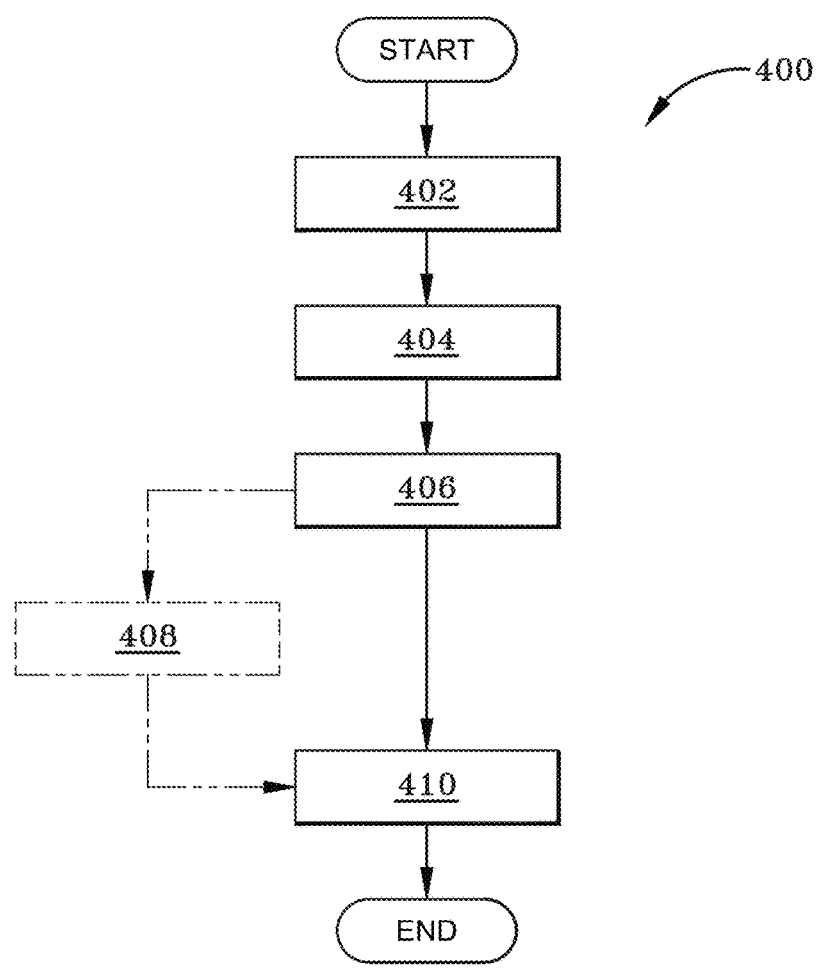
FIG. 4 is a flow chart depicting an exemplary method for vision-aided navigation.

Reference is now made to a vision-aided navigation method depicted in the flowchart of FIG. 4 and the associated exemplary results in FIGS. 5A-5E. The vision-aided navigation method 400 first captures a video frame image, which is shown generally at 402. Sensor metadata is used to extract an ortho-reference image from a reference database, which is shown generally at 404, and which is more fully described below. Sensor metadata is used to project the video frame captured by the sensor to the ground via ortho-rectification, which is shown generally at 406. An optional sensor model parameter search may be used to compensate for uncertainties in metadata, which is shown generally at 408. EPC techniques are used to register the ortho-rectified video frame against the ortho-reference image, which is shown generally at 410.

The method for vision-aided navigation 400 utilizes video data and metadata captured by the sensor 14 to determine vehicle 12 positional misalignment. Sensor metadata provides information regarding, among other things, sensor location and sensor orientation. The metadata is used to provide an estimate of vehicle 12 location, ground field-of-view and sensor pointing directions.

First, the sensor 14 captures a video frame image, which is shown generally at 402. The approximate video frame ground location is used to extract a reference image from a reference imagery database, which is shown generally at 404. The reference imagery database may be obtained, among other methods, from open source data sets, including Google® Street View, or may be created as described above through Automatic Fiducial Extraction, or by any other suitable method as one having ordinary skill in the art would understand. In order to compensate for uncertainty in the metadata related to the video frame ground position and coverage, the reference image selected consists of a larger area than the ground-projected video frame. The sensor metadata is used to project the video frame captured by the sensor to the ground via ortho-rectification as one having ordinary skill in the art would understand, which is shown generally at 406.

Prior to registering the ortho-rectified video frame against the ortho-reference image through EPC, an optional sensor model, or paradigm, parameter search may be used to compensate for uncertainties in metadata, which is shown generally at 408. The sensor model parameter search identifies non-translational sensor model parameter values, such as platform attitude, that contribute to geo-registration misalignment. The sensor model parameter search identifies corrected values for the non-translational parameters. After the non-translational values are corrected, the resulting EPC registration contains only translation offsets which represent the platform position error.

For example, let ($\Delta x$, $\Delta y$) denote the groundplane position offset relative to a local groundplane Cartesian coordinate system origin (e.g. a topographic system; ENU—East, North, Up) affixed to a reference ortho-image. That is, ($\Delta x$, $\Delta y$) represents the Cartesian coordinates of the platform offset in this local reference frame. Through a sequence of coordinate transformations, the offset vector ($\Delta x$, $\Delta y$) is transformed from the local reference frame to a vehicle 12 inertial measurement unit/inertial navigation system (IMU/INS) frame where this position error is corrected. The corrected position is sent to the IMU/INS guidance system and control component of the vehicle 12 to generate control commands to correct the vehicle 12 course, as needed.

Further, depending on vehicle 12 velocity, uncorrected vehicle 12 lateral position (e.g. East and North position components) can degrade by hundreds or thousands of meters or more across minutes, due to IMU drift as described above. Assuming a reasonably accurate on-board altimeter, these lateral position error components represent the primary position error, significantly dominating the altitude error. Thus, correction of the ($\Delta x$, $\Delta y$) error provides a significant position error reduction.

For some IMU/INS guidance system applications, particularly low-cost systems, platform altitude may also represent a significant error source. In this case, a full bundle-adjustment may be performed to simultaneously correct all sensor model parameter values, including platform position error. A full bundle-adjustment jointly refines a set of initial camera and structure parameter estimates for finding the set of parameters that most accurately predict the locations of the observed points in the set of available images.

To apply full bundle-adjustment, a sparse spatial grid is overlaid on the registered imagery. Feature correspondences between a registered video frame and an ortho-reference image at the sparse grid points are used as tie-points. Because EPC geo-registration aligns the imagery, the tie-point set exhibits high coherence, and need not be large. The small size of the tie-point set reduces the computational runtime of the full bundle-adjustment. The full bundle-adjustment may be rapidly implemented as the solution to a least-squares problem, using a linearized sensor model, linearized about the nominal sensor model metadata.

The full bundle-adjustment produces a three-dimensional offset vector ($\Delta x$, $\Delta y$, $\Delta z$) in the local reference ENU coordinate frame. Similarly to the above two-dimensional approach, the ($\Delta x$, $\Delta y$, $\Delta z$) offset vector transforms to the platform IMU/INS frame to correct the platform three-dimensional position.

In one embodiment according to the present disclosure, specific characteristics of the vehicle 12 and the sensor 14, such as a video sensor 14, determine which particular search over sensor model is utilized, if any. Video sensors 14 that output highly accurate metadata may not require an additional search over sensor model parameter. In the event a search over sensor model parameter is utilized and the proper metadata distortions have been removed, EPC produces a high, narrow correlation peak. The translational offset of the EPC peak corresponds to the translational position error of the platform. In other words, after the search algorithm removes non-translational errors, EPC captures the remaining translational error which identifies the platform position error. The positional offsets are then used to correct the vehicle 12 position.

Figure 5A:
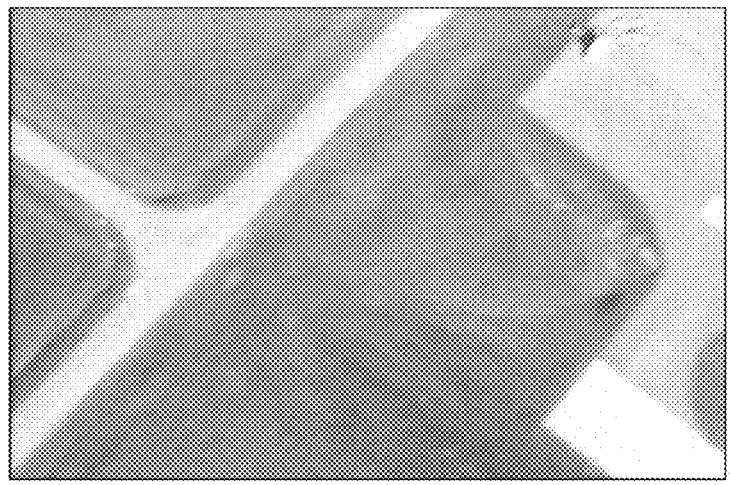
FIG. 5A is a test video frame image obtained from an aerial video frame.
Figure 5B:
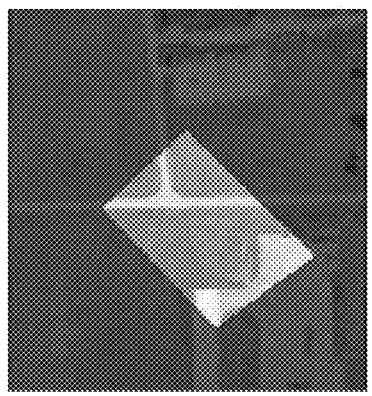
FIG. 5B is the test video frame image of FIG. 5A registered against a reference image using Enhanced Phase Correlation.
Figure 5C:
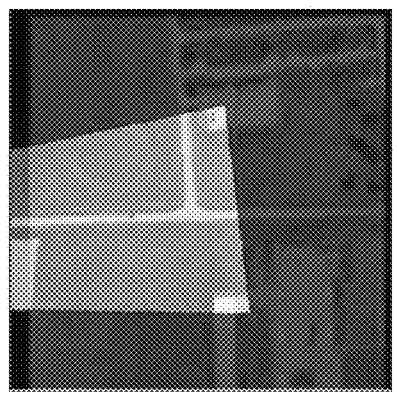
FIG. 5C is a different test video frame image registered against a reference image using Enhanced Phase Correlation.
Figure 5D:
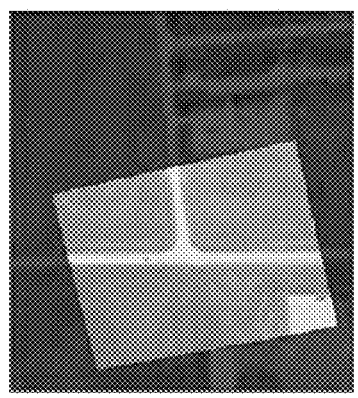
FIG. 5D is a different test video frame image registered against a reference image using Enhanced Phase Correlation.
Figure 5E:
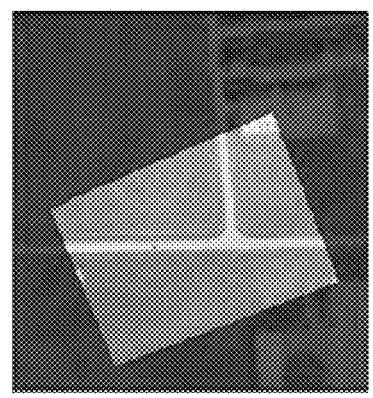
FIG. 5E is a different test video frame image registered against a reference image using Enhanced Phase Correlation.

FIG. 5A is a sample video frame image from a small unmanned aerial vehicle (SUAV). The sample video frame image of FIG. 5A is obtained from a video sensor on the SUAV. The sensor metadata from the video sensor is used to extract an ortho-reference image from the reference database. The sample video frame image captured by the video sensor of the SUAV is then ortho-rectified. The ortho-rectified sample video frame image is then geo-registered against the ortho-reference image through EPC. An example of the registration result of the sample video frame image of FIG. 5A to the ortho-rectified reference image is shown in FIG. 5B. FIGS. 5.C-5.E show examples of registration of other video frames to the ortho-rectified reference image.

Registration Error Covariance Estimation

The utility of the EPC geo-registration process is increased through the use of a registration error covariance measure which is derived from the EPC correlation surface as more fully described below. The registration covariance measure provides an estimate of the registration accuracy, which can be used to estimate uncertainty in the platform position update. The registration error covariance estimation consists of performing a least-squares fit of a two-dimensional Gaussian to the neighborhood of the Enhanced Phase Correlation peak value as a measure of platform position accuracy.

For example, consider the non-normalized 2D Gaussian:

$$f(x, y) = \alpha e^{-\frac{1}{2}[(\eta-\mu)^T \Sigma^{-1} (\eta-\mu)]} \quad (1)$$

where $$\mu = \begin{pmatrix} \mu_x \\ \mu_y \end{pmatrix}, \eta = \begin{pmatrix} x \\ y \end{pmatrix},$$

for mean $\mu$, covariance matrix $\Sigma$, and positive scale factor $\alpha$. Taking the log of both sides in (1) gives:

$$\log f(x, y) = \log(\alpha) - \frac{1}{2} Q(x, y) \quad (2)$$

for quadratic form:

$$Q(x, y) = [(x - \mu_x) \quad (y - \mu_y)] \Sigma^{-1} \begin{bmatrix} x - \mu_x \\ y - \mu_y \end{bmatrix}. \quad (3)$$

Expanding out the quadratic form in (3) and simplifying gives:

$$Q(x, y) = [(x - \mu_x) \quad (y - \mu_y)] \begin{pmatrix} \sigma^{11} & \sigma^{12} \\ \sigma^{12} & \sigma^{22} \end{pmatrix} \begin{bmatrix} x - \mu_x \\ y - \mu_y \end{bmatrix} \quad (4)$$

$$= (\sigma^{11})x^2 + (2\sigma^{12})xy + (\sigma^{22})y^2 +$$
$$(-2\sigma^{11}\mu_x - 2\sigma^{12}\mu_y)x +$$
$$(-2\sigma^{12}\mu_x - 2\sigma^{22}\mu_y)y +$$
$$(2\sigma^{12}\mu_x\mu_y + \sigma^{11}\mu_x^2 + \sigma^{22}\mu_y^2)1.$$

Substituting (4) into (2) gives:

$$\log f(x, y) = \left(\frac{-\sigma^{11}}{2}\right)x^2 + (-\sigma^{12})xy + \left(\frac{-\sigma^{22}}{2}\right)y^2 + (\sigma^{11}\mu_x + \sigma^{12}\mu_y)x + \quad (5)$$

$$(\sigma^{12}\mu_x + \sigma^{22}\mu_y)y + \left(-\sigma^{12}\mu_x\mu_y - \frac{\sigma^{11}\mu_x^2}{2} - \frac{\sigma^{22}\mu_y^2}{2} + \log(\alpha)\right)1.$$

In (5), denote the six coefficients in parentheses by $\xi_1, \xi_2, \xi_3, \xi_4, \xi_5, \xi_6$ and substitute into (5) to get:

$$\log f(x,y) = \xi_1 x^2 + \xi_2 xy + \xi_3 y^2 + \xi_4 x + \xi_5 y + \xi_6 1. \quad (6)$$

Let the set of coordinates $\{(x_i, y_i)\}_{i=1}^n$ denote the coordinates of the portion of the EPC correlation surface that is being fit. Let $\{s_i\}_{i=1}^n$ denote the log of the EPC correlation surface at the coordinates $\{(x_i, y_i)\}_{i=1}^n$. Next, setup a least squares fit for the $\xi_i$ by solving:

$$\begin{pmatrix} s_1 \\ \vdots \\ s_n \end{pmatrix} = \begin{pmatrix} x_1^2 & x_1 y_1 & y_1^2 & x_1 & y_1 & 1 \\ \vdots & \vdots & \vdots & \vdots & \vdots & \vdots \\ x_n^2 & x_n y_n & y_n^2 & x_n & y_n & 1 \end{pmatrix} \begin{pmatrix} \xi_1 \\ \xi_2 \\ \xi_3 \\ \xi_4 \\ \xi_5 \\ \xi_6 \end{pmatrix} \quad (7)$$

or, correspondingly from (7):

$$S = A\hat{P}. \quad (8)$$

The solution to (8) is given by $$\hat{P} = (A^T A)^{-1} A^T S. \quad (9)$$

From the definitions of the $\xi_i$ (in (6)), and from (5) and (9), we deduce that:

$$\xi_1 = \left(\frac{-\sigma^{11}}{2}\right), \xi_2 = -\sigma^{12}, \xi_3 = \left(\frac{-\sigma^{22}}{2}\right) \quad (10)$$

and thus $$\sigma^{11} = -2\xi_1, \sigma^{12} = -\xi_2, \sigma^{22} = -2\xi_3. \quad (11)$$

The terms in (11) are the entries in the inverse covariance matrix. However, the covariance matrix needs to be obtained. Thus, the inverse covariance matrix must be inverted. For this simple case we have:

$$\begin{pmatrix} \sigma_{11} & \sigma_{12} \\ \sigma_{12} & \sigma_{22} \end{pmatrix} = \begin{pmatrix} \sigma^{11} & \sigma^{12} \\ \sigma^{12} & \sigma^{22} \end{pmatrix}^{-1} \quad (12)$$

-continued $$= \begin{pmatrix} \frac{\sigma^{22}}{\sigma^{11}\sigma^{22} - (\sigma^{12})^2} & \frac{-\sigma^{12}}{\sigma^{11}\sigma^{22} - (\sigma^{12})^2} \\ \frac{-\sigma^{12}}{\sigma^{11}\sigma^{22} - (\sigma^{12})^2} & \frac{\sigma^{11}}{\sigma^{11}\sigma^{22} - (\sigma^{12})^2} \end{pmatrix}.$$

Using (11) in (12) produces the final result:

$$\sigma_{11} = \frac{-2\xi_3}{4\xi_1\xi_3 - \xi_2^2},\ \sigma_{12} = \frac{\xi_2}{4\xi_1\xi_3 - \xi_2^2},\ \sigma_{21} = \sigma_{12},\ \sigma_{22} = \frac{-2\xi_1}{4\xi_1\xi_3 - \xi_2^2}.$$

Figure 6A:
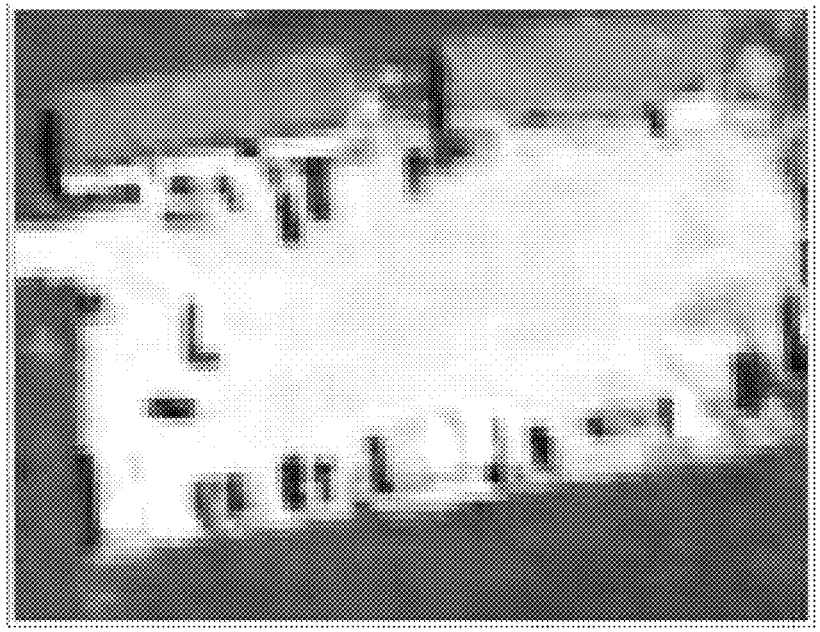
FIG. 6A is a cropped test video frame image.
Figure 6B:
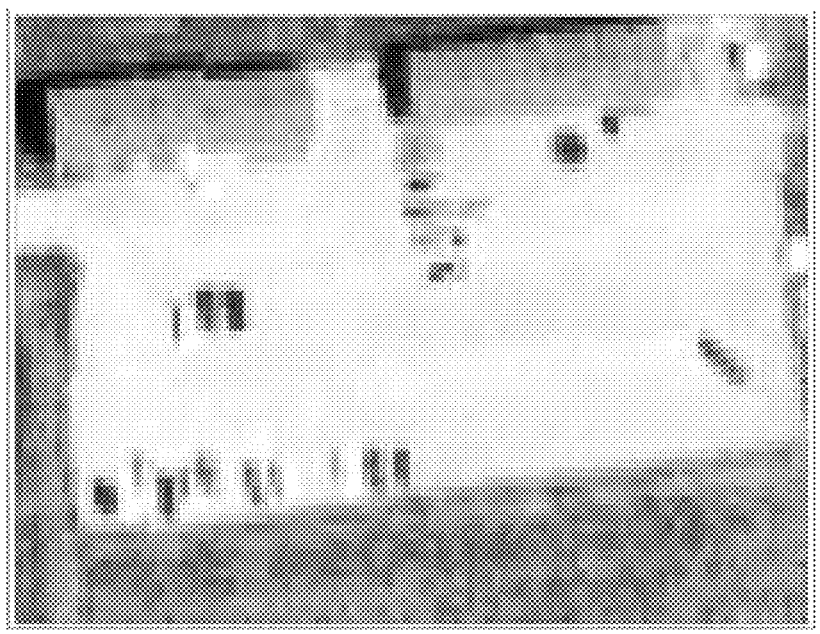
FIG. 6B is a cropped reference video frame image.

Example results are presented herein that demonstrate the effectiveness of estimating the geo-registration error for registration of a cropped video frame test image to a cropped reference image. FIG. 6A shows the cropped video frame test image and FIG. 6B shows the cropped reference image. The cropped video frame test image of FIG. 6A is registered against the cropped reference image of FIG. 6B through EPC.

Figure 6C:
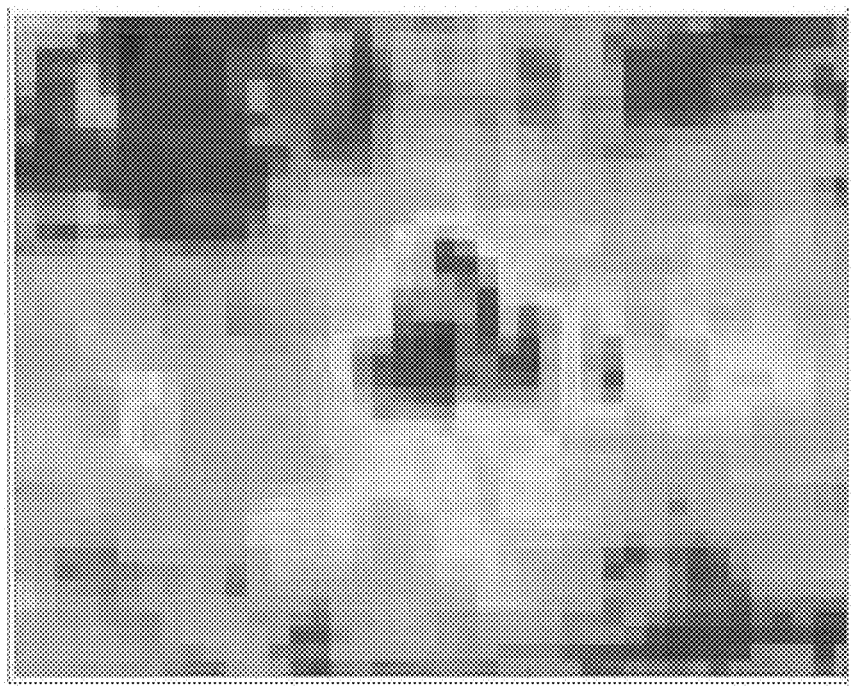
FIG. 6C is a cropped central section of the Enhanced Phase Correlation surface resulting from the Enhanced Phase Correlation registration of the cropped test video frame image of FIG. 6A to the cropped reference video frame image of FIG. 6B.
Figure 6D:
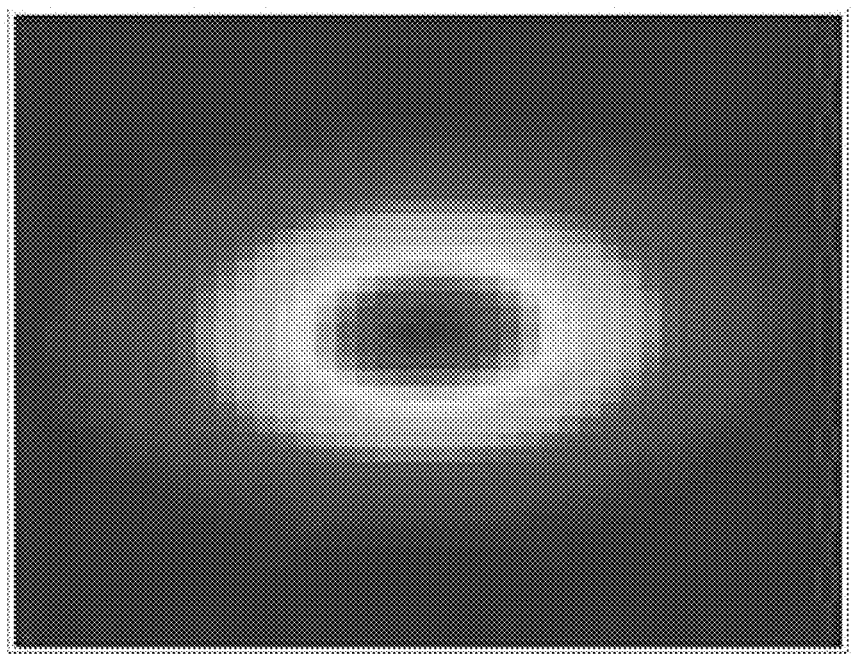
FIG. 6D is a graph of a Gaussian Fit to the Enhanced Phase Correlation peak of the cropped central section of the Enhanced Phase Correlation surface of FIG. 6C.

FIG. 6C is a cropped correlation surface of the EPC registration of the cropped video frame test image of FIG. 6A against the cropped reference image of FIG. 6B. FIG. 6D is a Gaussian Fit to the EPC peak of FIG. 6C. For this example, the covariance matrix of the fitted Gaussian is given by:

$$\begin{pmatrix} 22.96 & -1.74 \\ -1.74 & 43.94 \end{pmatrix}.$$

Vision-Aided Navigation (2)

Figure 8A:
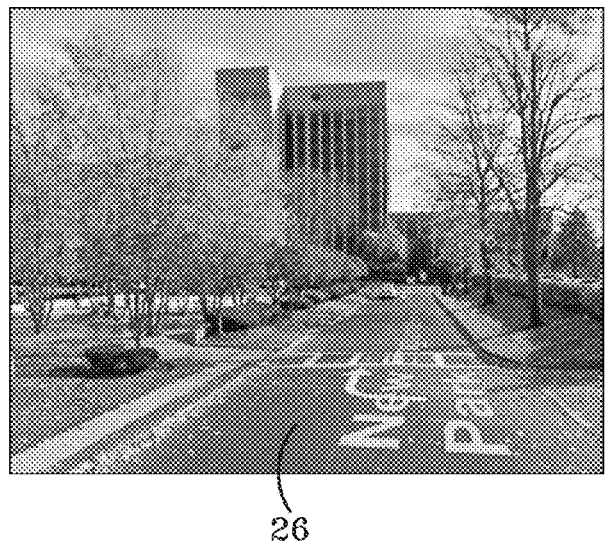
FIG. 8A is a reference image obtained from Google® Street View.
Figure 8B:
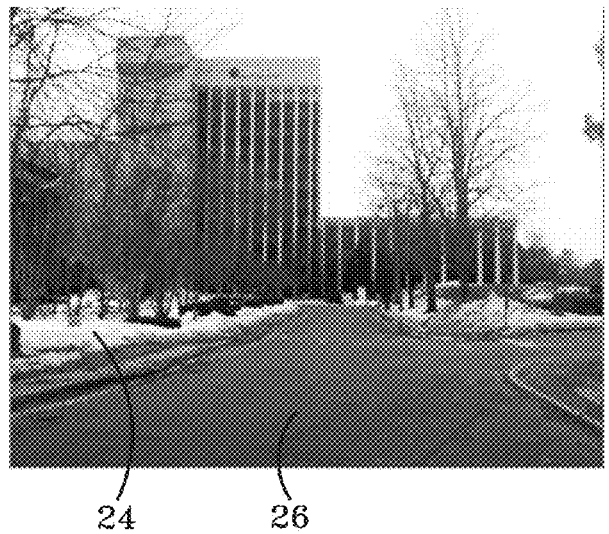
FIG. 8B is a test image obtained with a mobile phone camera of the scene where the reference image of FIG. 8A was obtained.
Figure 8C:
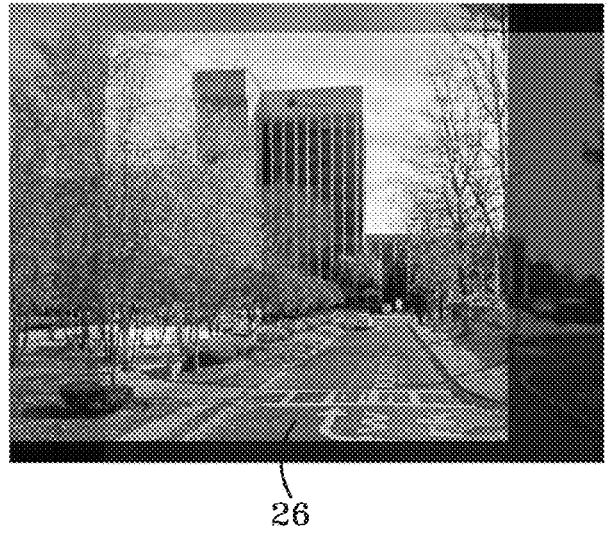
FIG. 8C is overlaid imagery of post Enhanced Phase Correlation registration of the reference image of FIG. 8A and the test image of FIG. 8B.
Figure 9A:
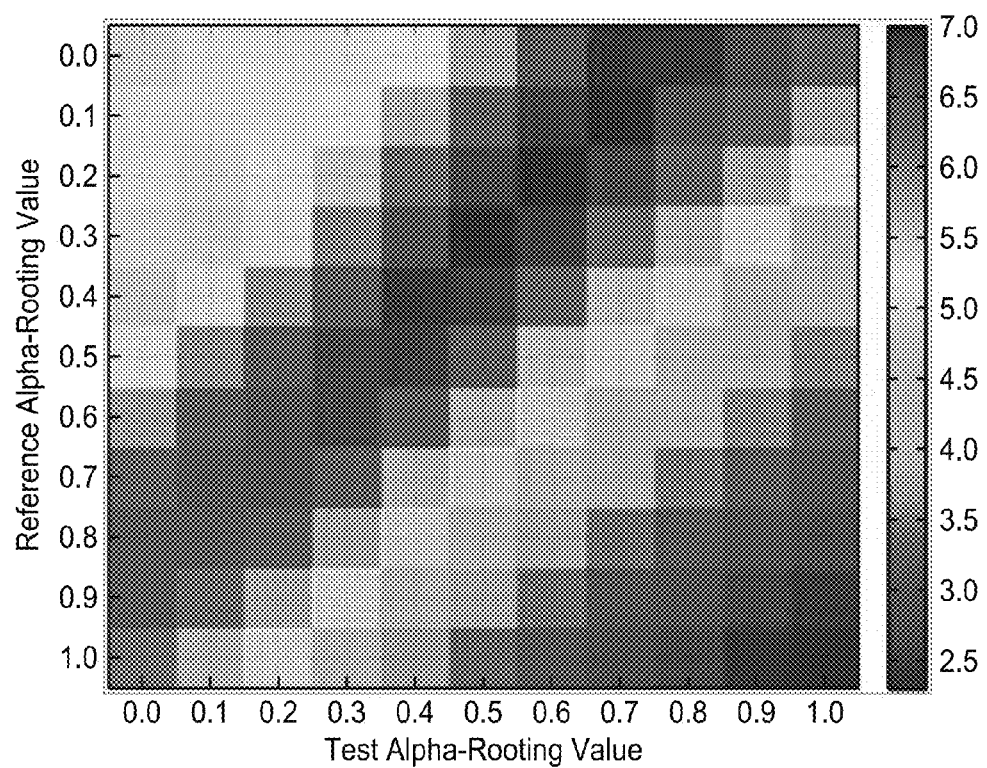
FIG. 9A is a graphical representation of the Enhanced Phase Correlation match score of the reference image of FIG. 8A and the test image of FIG. 8B as a function of alpha-rooting parameters.
Figure 9B:
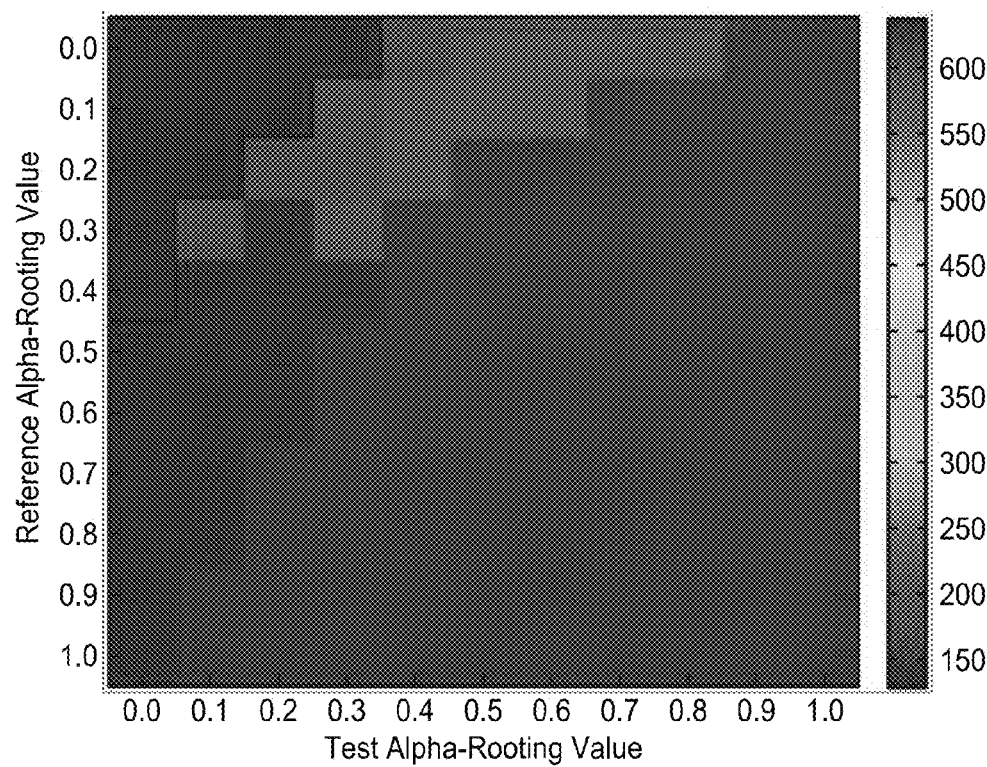
FIG. 9B is a graphical representation of the X-direction shift between the reference image of FIG. 8A and the test image of FIG. 8B as a function of alpha-rooting parameters.
Figure 9C:
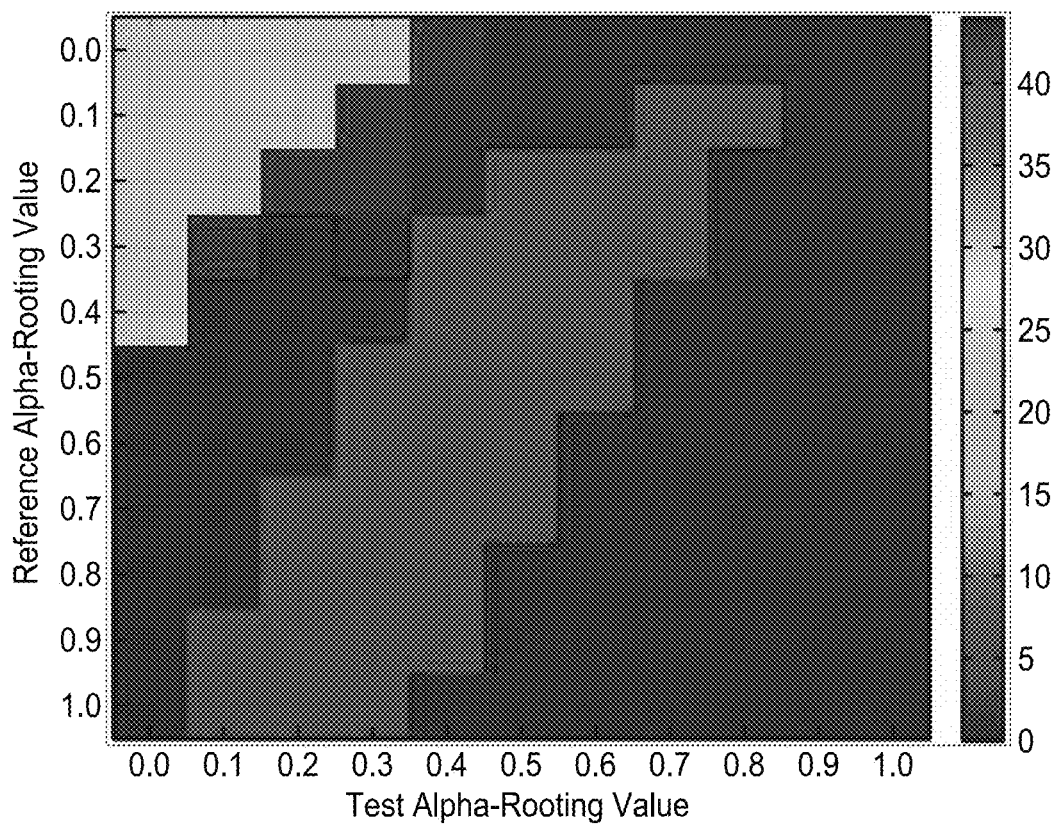
FIG. 9C is a graphical representation of the Y-direction shift between the reference image of FIG. 8A and the test image of FIG. 8B as a function of alpha-rooting parameters.
Figure 10:
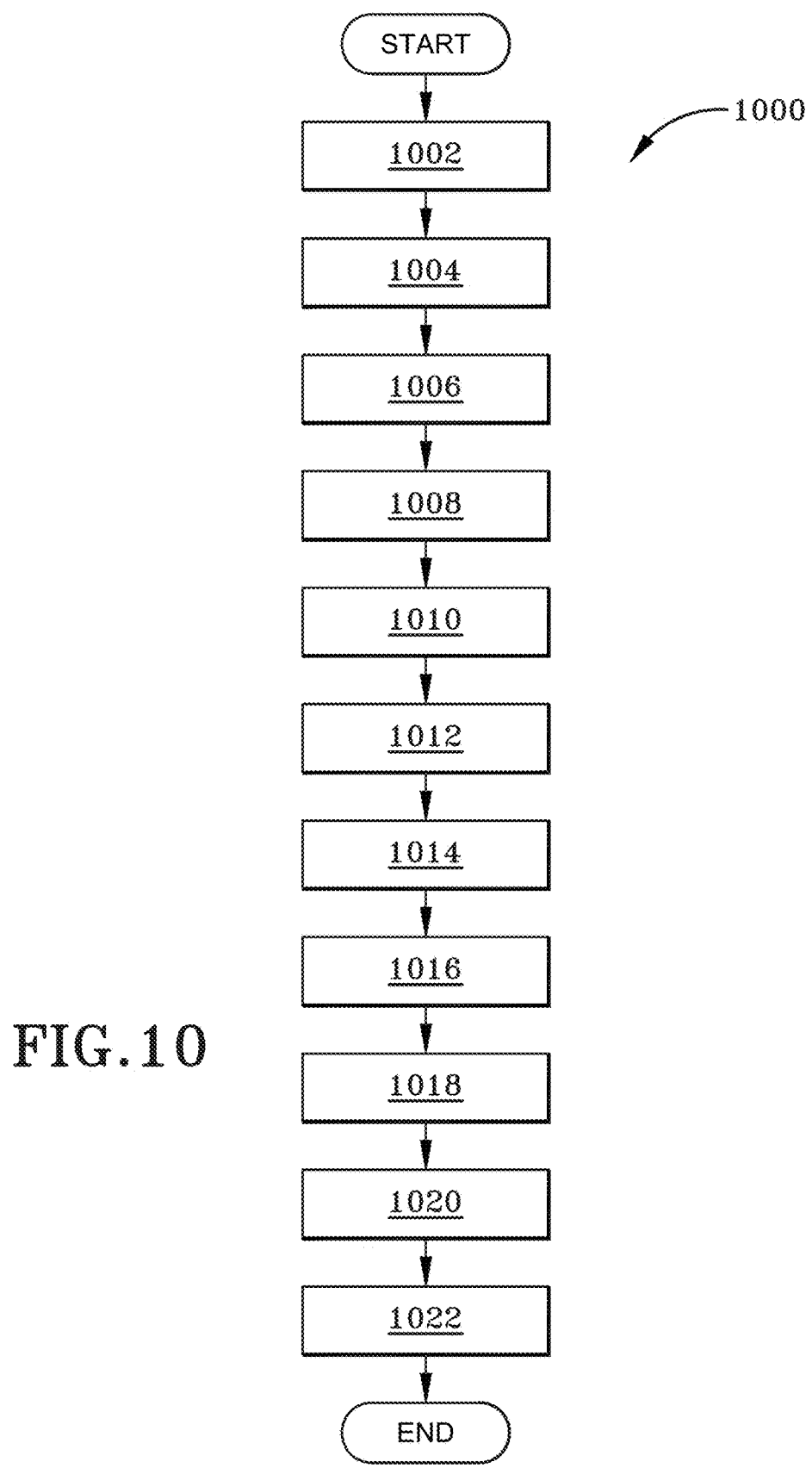
FIG. 10 is a flow chart depicting an exemplary method for vision-aided navigation.

Reference is now made to the vision-aided navigation flowchart of FIG. 10 and the associated exemplary results in FIGS. 7A-9C. The method 1000 of vision-aided navigation comprises the steps of generating a pre-planned route of travel, shown generally at 1002, generating accurate waypoints along the route, shown generally at 1004, creating a reference imagery database, shown generally at 1006, traveling along the pre-planned route in a vehicle 12, shown generally at 1008, acquiring imagery along the route, shown generally at 1010, selecting reference imagery from the reference imagery database, shown generally at 1012, registering the acquired imagery against the selected reference imagery, shown generally at 1014, determining if the registration solution is correct, shown generally at 1016, determining the coordinates associated with the reference image after a correct registration solution is obtained, shown generally at 1018, updating the INS 48 of the vehicle 12, shown generally at 1020 and correcting the position of the vehicle 12 shown generally at 1022.

In one particular embodiment according to the present disclosure, the vision-aided navigation method 100 generates a pre-planned route 40. The pre-planned route 40 may be generated in any suitable manner as one having ordinary skill in the art would understand. For example, in the event the vehicle 12 is a ground-based vehicle, the ground-based vehicle may travel along a desired route to, among other things, collect data, create waypoints 42 and collect reference imagery in order to create the pre-planned route 40. In the event the vehicle 12 is an aerial vehicle, a human analyst may pre-plan a desired route based on certain information, including, but not limited to, individual mission profiles which contain operational and logistic information. Alternatively, route-planning algorithms may be used to design a desired route based on optimization of a certain function, including, but not limited to, minimizing flight time or maximally avoiding danger.

After the pre-planned route 40 is generated, accurate waypoints 42, which are reference points in physical space used for purposes of navigation and are otherwise known as landmarks, are generated along the pre-planned route 40. The waypoints 42 may be generated in any suitable manner as one having ordinary skill in the art would understand. For example, the waypoints 42 may be generated with respect to a local coordinate system having origin at the initial position of the vehicle 12. As another example, the waypoints 42 may be generated by collecting high-accuracy geo-coordinate fixes by traveling along the pre-planned route. Yet another example includes extracting waypoint 42 geo-coordinates from open sources such as Google® Open Street Map.

Next, the vision-aided navigation method 100 creates a reference imagery database against which later vehicle-acquired imagery 44 registers for localization. The reference imagery database may be generated in any suitable manner as one having ordinary skill in the art would understand. In one particular embodiment according to the present disclosure, the method for vision-aided navigation 100 identifies fiducial image patches which will be persistent across multi-temporal imagery as described above. Thus, fiducial image patches having sufficient scene content information for reliable registration are selected and tagged with appropriate location identifiers as described above. For example, the reference imagery 46 may be obtained from sensors 14 mounted on a vehicle 12. In this example, the vehicle 12 travels along the pre-planned route 40 to collect imagery and robust fiducial image patches are identified from the collected imagery. Later, vehicle-acquired imagery 44 is registered against the reference imagery 46 for localization. Another example includes obtaining reference imagery 46 from open sources such as Google® Street View.

Next, an aerial or ground-based vehicle 12, which may be manned or autonomous, travels along the pre-planned route 40 starting from an initial vehicle 12 position. The vehicle 12 has at least one sensor 14 which can be mounted at various azimuthal angles. The vehicle 12 utilizes the waypoints 42 and an INS 48 to travel along the pre-planned route 40. INS 48 position estimates are used to navigate the vehicle 12 between waypoints 42 while being updated along the route 40 as described in greater detail below. As the vehicle 12 travels along the pre-planned route 40, the sensor 14 acquires imagery 44. The sensors 14 can be placed on the vehicle 12 in various positions. For example, one sensor 14 can be mounted to acquire imagery 44 transverse to the vehicle 12 direction of travel and one sensor 14 can be mounted to acquire imagery 44 that is forward of the vehicle 12 relative to the longitudinal axis of the vehicle 12. As the vehicle 12 travels along the route 40, the sensors 14 acquire imagery 44 and the vision-aided navigation method 100 selects reference imagery 46 from the reference imagery database based on the reference image metadata. The imagery acquired 44 by the sensors 14 is then registered against the selected reference imagery 46.

The EPC VM is used to determine the correctness of the registration solution. A large EPC VM corresponds to a match between the vehicle-acquired imagery 44 and the reference imagery 46. A control system 50 of the vehicle 12 utilizes the corrected position and the pre-planned route 40 information to generate a control signal to correct the vehicle 12 motion, as needed.

Figure 7A:
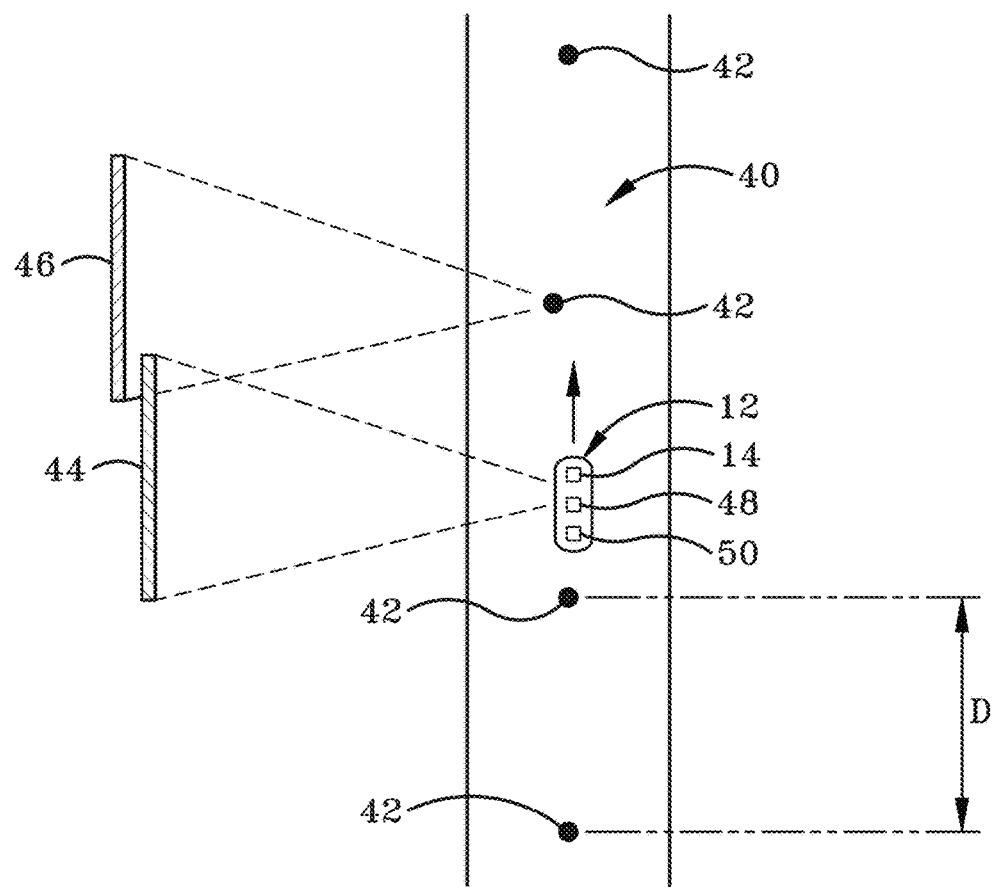
FIG. 7A is a general diagrammatic view of an embodiment of a vision-aided navigation system where the system generates updated position coordinates utilizing a side-view camera.

Reference is now made to FIG. 7A which is one embodiment of the method 100. The vehicle 12 in FIG. 7A travels along the pre-planned route 40 from a first waypoint 42 to a second waypoint 42. The vehicle 12 utilizes an INS 48 to navigate between waypoints 42, which is shown generally at distance D until updated as more fully described below. While sensors 14 can be mounted to the vehicle 12 in any suitable manner to acquire imagery 44 in all directions, the sensor 14 in this embodiment is mounted on the vehicle 12 so that the sensor 14 acquires imagery 44 transverse to the vehicle 12 direction of travel. This allows localization of the vehicle 12 forward of the vehicle 12 relative to the longitudinal axis of the vehicle 12.

The acquired imagery 44 is registered against reference imagery 46 taken from the waypoint 42 position. As shown in FIG. 7A, the vehicle-acquired imagery 44 has small overlap with the reference imagery 46. Since there is little overlap, the registration solution is poor as indicated by a low EPC VM. The vehicle 12 continues to travel towards the waypoint 42, and when the vehicle 12 arrives at the waypoint 42, the acquired imagery 44 will have a large amount of overlap with the reference imagery 46. Since there is large overlap, and the feature content matches, the registration solution is strong as indicated by a large EPC VM. As the vehicle 12 continues to travel away from the waypoint 42 where the reference imagery 46 was acquired, the registration solution degrades.

Figure 7B:
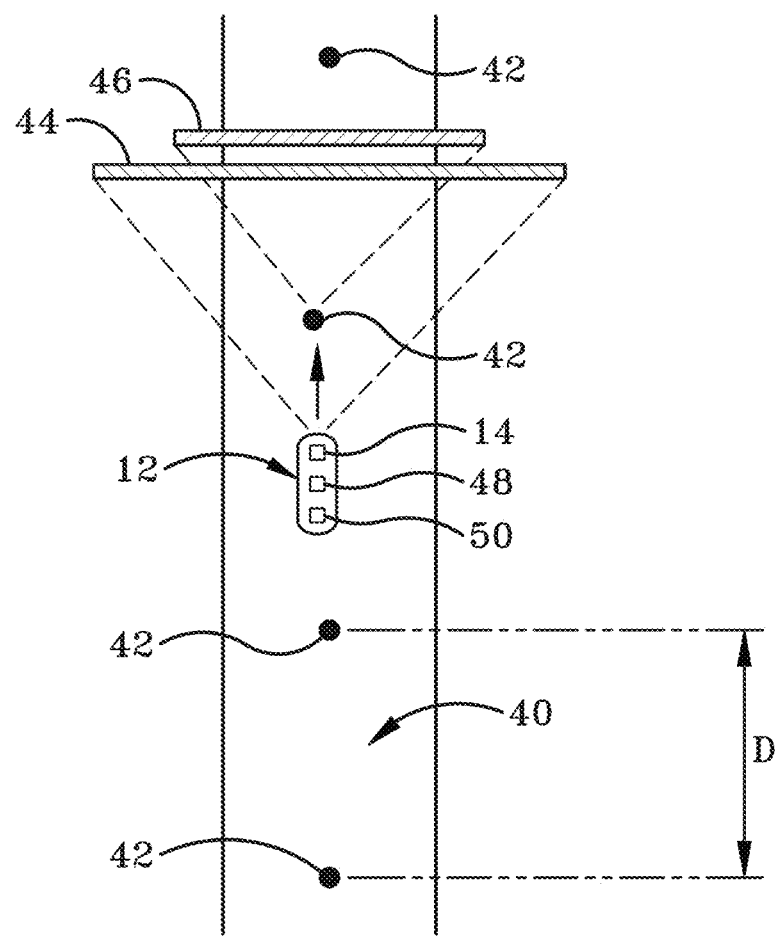
FIG. 7B is a general diagrammatic view of an embodiment of a vision-aided navigation system where the system generates updated position coordinates utilizing a forward-looking camera.

Reference is now made to FIG. 7B which is one embodiment of the method 100. The vehicle 12 in FIG. 7B travels along the pre-planned route 40 from a first waypoint 42 to a second waypoint 42. While sensors 14 can be mounted to the vehicle 12 in any suitable manner to acquire imagery 44 in all directions, the sensor 14 in this embodiment is mounted on the front of the vehicle 12 so that the sensor 14 acquires imagery 44 that is forward of the vehicle 12 relative to a longitudinal axis of the vehicle 12. This allows localization of the vehicle 12 forward of the vehicle 12 relative to the longitudinal axis of the vehicle 12 and transverse of the direction of travel. The acquired imagery 44 is registered against reference imagery 46 taken from the first waypoint 42 position. The vehicle 12 continues to travel towards the first waypoint 42, and when the vehicle 12 arrives at the first waypoint 42, the acquired imagery 44 will have a large amount of overlap with the reference imagery 46. Since there is large overlap, and the feature content matches, the registration solution is strong as indicated by a large EPC VM number. As the vehicle 12 continues to travel away from the first waypoint 42 where the reference imagery 46 was acquired, the registration solution degrades.

Figure 7C:
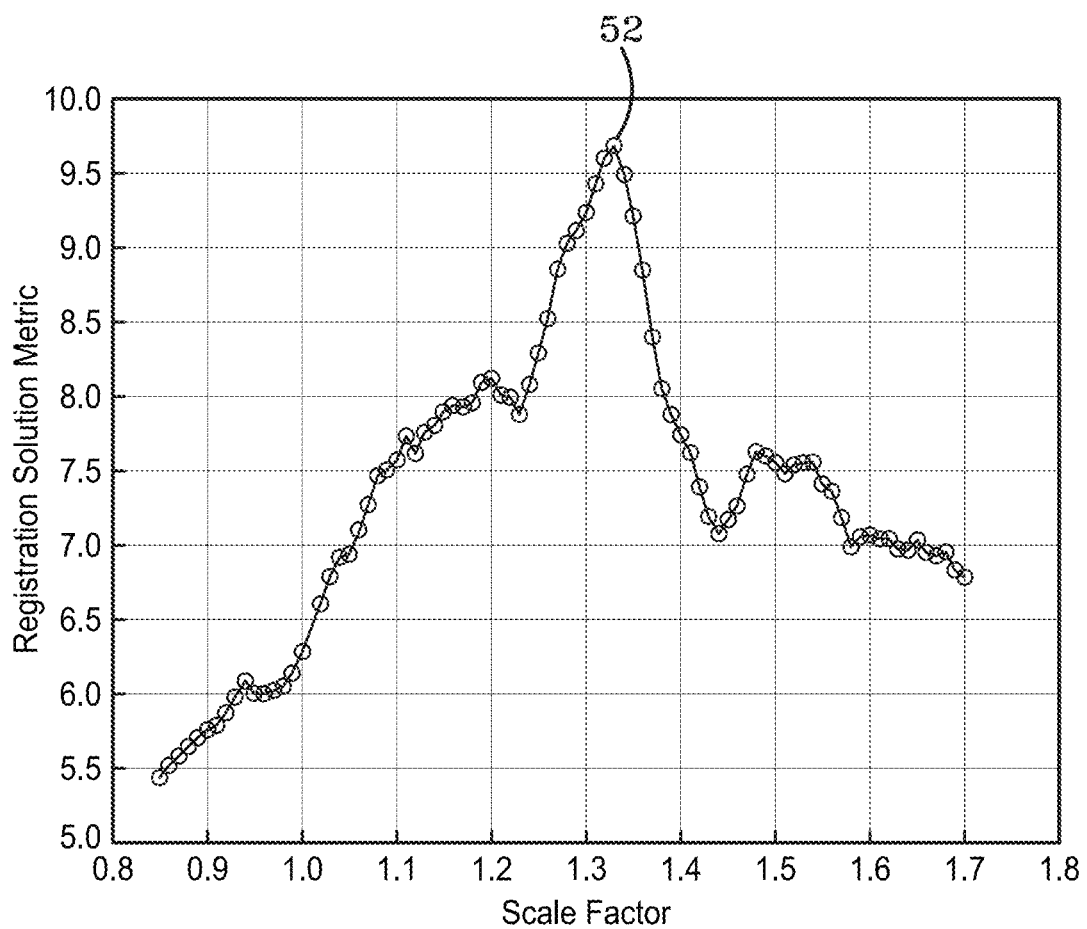
FIG. 7C is a graph of the registration results of the registration of the reference image of FIG. 8A and the test image of FIG. 8B as a function of test image rescaling.

Reference is now made to FIGS. 7C, 8A and 8B. FIG. 7C is a graph of the registration results of the registration of the reference image of FIG. 8A and the test image of FIG. 8B as a function of test image rescaling. This registration solution improves until reaching the correct position (i.e. the waypoint 42) at which the reference image was acquired (i.e. the local time-peak 52) and that the registration solution then degrades as the vehicle 12 passes the correct position (i.e. waypoint 42). Prior to EPC registration of the test image of FIG. 8B against the reference image of FIG. 8A, the test image of FIG. 8B was rescaled to a size that corresponds with the size of the reference image of FIG. 8A. The test image may be rescaled in any suitable manner as one having ordinary skill in the art would understand. For example, in order to make the test image larger or smaller, an interpolation between the points on the test image is conducted as one of ordinary skill in the art would understand. As shown in FIG. 7C, the registration solution improves until reaching the correct position (i.e. the waypoint 42) at which the reference image was acquired and the registration solution then degrades as the vehicle 12 passes the correct position (i.e. waypoint 42).

Figure 7D:
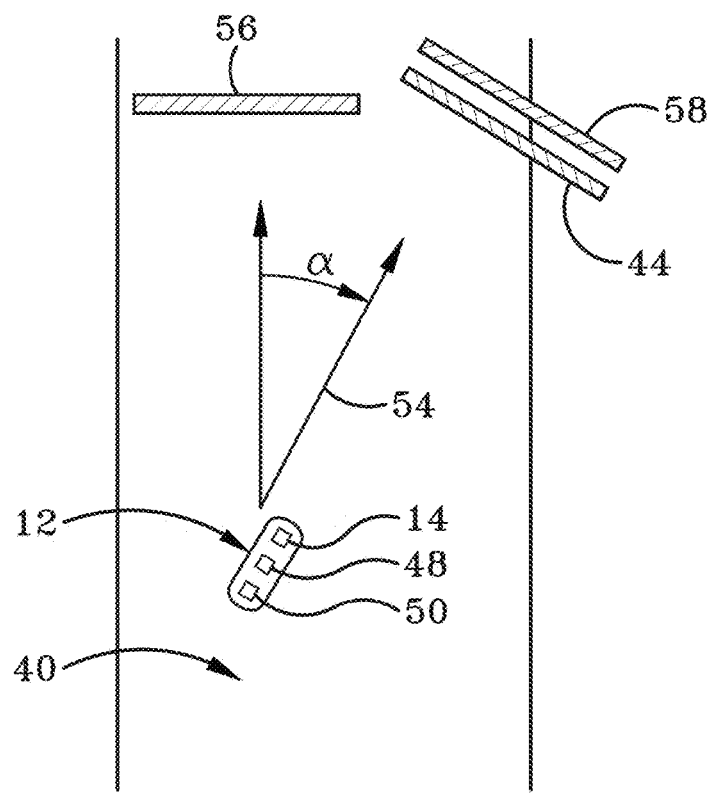
FIG. 7D is a general diagrammatic view of an embodiment of a vision-aided navigation system where the system generates updated position coordinates utilizing a forward-looking camera that points in an azimuthally offset direction relative to the direction of a nominal reference image.

Reference is now made to FIG. 7D which is one embodiment of the method 100. As the vehicle 12 travels along the pre-planned route 40, IMU/INS drift may cause a heading angle error $\alpha$ which causes the vehicle 12 to travel at an incorrect heading 54. The vehicle 12 in FIG. 7D travels along the pre-planned route 40 at an incorrect heading 54. While sensors 14 can be mounted to the vehicle 12 in any suitable manner to acquire imagery in all directions, the sensor 14 in this embodiment is mounted on vehicle 12 so that the sensor 14 acquires imagery forward of the vehicle 12 relative to the longitudinal axis of the vehicle 12. Since the vehicle 12 is traveling at an incorrect heading 54, the sensor 14 points in an azimuthally offset direction relative to the direction of the nominal reference imagery 56, which would be in directly in front of the vehicle 12 if the vehicle 12 was traveling at the correct heading. In this case, a local azimuth angle search is conducted in any suitable manner as one having ordinary skill in the art would understand. In one particular embodiment, the INS 48 has a known accuracy. The accuracy of the INS 48 is used to determine an estimated amount of heading error. Based on the estimated heading error, the search area is determined by searching a distance at least a distance greater than the estimated heading error. The azimuth can be stepped a certain amount over the distance of the search in any suitable manner. While the search is conducted, reference imagery offset in azimuth angle 58 from the nominal forward-acquired reference imagery 56 is registered against the vehicle-acquired imagery 44. EPC is used to produce an EPC VM match, as indicated by the maximum VM score, as a function of reference image azimuth angle which provides an angle error estimate. The heading angle error estimate is then used to drive a control system 50 to zero-out the angle error and correct the vehicle 12 heading.

Figure 7E:
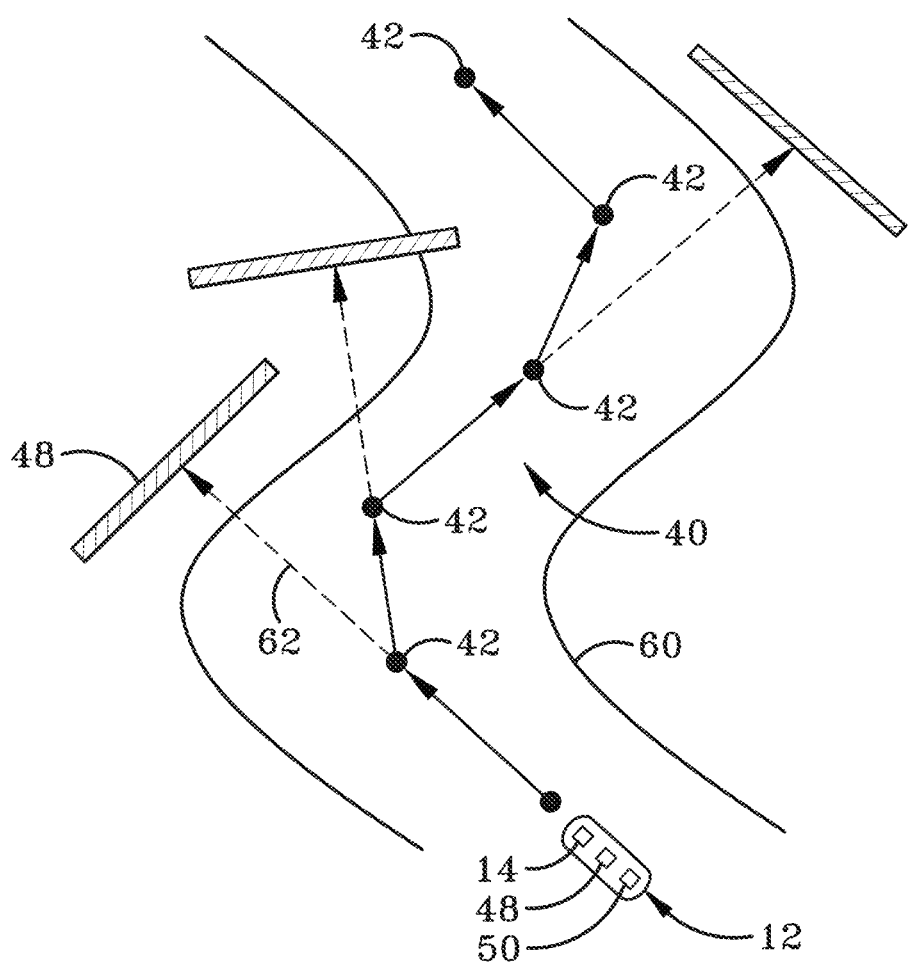
FIG. 7E is a general diagrammatic view of an embodiment of a vision-aided navigation system for navigation around a curve where the system generates updated position coordinates utilizing a forward-looking camera.

Reference is now made to FIG. 7E which is one embodiment of the method 100. The vehicle 12 in FIG. 7E travels along the pre-planned route 40 from a first waypoint 42 to a second waypoint 42 around a number of curves 60. A sensor is mounted on the front of the vehicle 12 so that the sensor acquires imagery 44 that is forward of the vehicle 12 relative to a longitudinal axis of the vehicle 12. This allows localization of the vehicle 12 forward of the vehicle 12 relative to the longitudinal axis of the vehicle 12 and transverse of the direction of travel. The method 100 allows the vehicle 12 to travel around curves 60 by varying the selected reference imagery 46. As the vehicle 12 travels from a known waypoint 42 to the next known waypoint 42, and since the vehicle 12 is disposed between the two waypoints 42, a line-of-sight 62 direction between the two known waypoints 42 can be obtained and used to select the appropriate reference imagery 46. The appropriate reference imagery 46 for each waypoint 42 can be calculated from geometry of known waypoints 42. Waypoints 42 must be created with higher density along curved routes to ensure correct travel between waypoints 42. Through EPC, the acquired imagery 44 is registered against reference imagery 46 taken from the waypoint 42 position. The vehicle 12 continues to travel towards the waypoint 42, and when the vehicle 12 arrives at the waypoint 42, the acquired imagery 44 will have a large amount of overlap with the reference imagery 46. Since there is large overlap, and the feature content matches, the registration solution is strong as indicated by a large EPC VM number. The vehicle 12 then travels towards the next waypoint 42 based on the appropriate reference imagery 46 at the next waypoint. As the vehicle 12 continues to travel away from the waypoint 42 where the reference imagery 46 was acquired, the registration solution degrades.

Reference is now made to FIGS. 8A-8C. Example results are presented that demonstrate the effectiveness of EPC-based registration. FIG. 8A is reference imagery which was extracted from Google® Street View. FIG. 8B is a test image acquired from a mobile phone and simulates the vehicle-acquired imagery 44 of the method 100. A comparison of the reference image of FIG. 8A to the test image of FIG. 8B shows differences in scene content. For example, the test image of FIG. 8B was acquired during winter, and, therefore, contains snow ground cover 24 not present in the reference image of FIG. 8A.

Despite the differences in the test image of FIG. 8B and the reference image of FIG. 8A, EPC successfully registered the image pair as shown in FIG. 8C which is the registered, overlaid image pair. The overlaid image of FIG. 8C contains a color scheme which differentiates the two images. For example, FIG. 8C is an overlaid image which contains the colors green, red and grey or near-grey. The green portions of the overlaid image identify portions of the reference image. The red portions of the overlaid image identify portions of the test image. The grey or near-grey portions of the overlaid image signify matching pixels between the reference image and the test image which represents a perfect registration.

Reference is now made to FIGS. 9A-9C. FIG. 9A shows the EPC VM match score as a function of alpha-rooting parameters, which are parameters used to tune EPC performance, for the reference image of FIG. 8A and the test image of FIG. 8B. EPC has been developed as an improvement to classical phase correlation. The most general form of EPC uses a modified correlation approach in which alpha-rooting parameters are applied to the Fourier amplitude terms in the denominator of the frequency-domain expression for phase correlation. For example, in one embodiment according to the present disclosure, for test and reference images, $I_R(x, y)$, $I_T(x, y)$, Fourier transform operator F, and frequency domain phase correlation expression $C_\Phi$, EPC is given by:

$$C_\Phi\{I_T, I_R\}(\omega_x, \omega_y) = \frac{F\{I_T\}(\omega_x, \omega_y) F^*\{I_R\}(\omega_x, \omega_y)}{|F\{I_T\}(\omega_x, \omega_y)|^{(1-\alpha_T)} |F^*\{I_R\}(\omega_x, \omega_y)|^{(1-\alpha_R)}}$$

where $0 \leq \alpha_R, \alpha_T \leq 1$ denote the alpha-rooting parameters. By tuning $\alpha_R$, $\alpha_T$ the correlation expression $C_\Phi$ can range between classical amplitude correlation ($\alpha_R$, $\alpha_T=1$) to classical phase correlation ($\alpha_R$, $\alpha_T=0$). The alpha-rooting parameters control the degree of Fourier magnitude equalization (whitening). Tuning these parameters enables a tradeoff between a high narrow correlation peak which facilitates image matching, and a smaller, wider peak which provides robustness to geometric misalignments. A major benefit of the alpha-rooting parameters is the ability to tune the parameter values to the characteristics of the imagery to be registered; however, registering sample imagery is usually necessary to determine which parameters to utilize for the particular imagery being registered.

FIG. 9A shows a range of alpha-rooting parameters for which large EPC VM match scores result. The best results occur for reference and test alpha-rooting parameter values of 0.2 and 0.6 respectively. As shown in FIG. 9A, certain parameter values work better than others. FIG. 9B and FIG. 9C show a range of alpha-rooting parameter values that produce the correct registration. The peak alpha-rooting parameters produce the highest match score and the correct registration solution.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A method for vision-aided navigation comprising:
    identifying fiducials that persist across multi-temporal imagery;
    creating a reference imagery database based, at least partially, on the identified fiducials;
    obtaining test imagery from a vehicle;
    registering the test imagery against reference imagery from the reference imagery database;
    obtaining a correct registration solution, whereby the correct registration solution indicates that the acquired test imagery matches the reference imagery;
    determining coordinates of a location at which the test imagery was acquired;
    estimating a position error of the vehicle; wherein the estimated position error is based, at least partially, on coordinates of a location of the reference imagery;
    correcting the position error of the vehicle; and
    guiding the vehicle based, at least partially, on the corrected error position.

2. The method for vision-aided navigation of claim 1, further comprising:
    generating a pre-planned route of travel for the vehicle, wherein the vehicle includes a guidance system.

3. The method for vision-aided navigation of claim 2, further comprising:
    utilizing Enhanced Phase Correlation (EPC) techniques to identify the fiducials that persist across multi-temporal imagery.

4. The method for vision-aided navigation of claim 3, wherein the identified fiducials are image patches of the reference imagery located along the pre-planned route of travel.

5. The method for vision-aided navigation of claim 4, further comprising:
    generating at least two waypoints along the pre-planned route of travel; and
    establishing an initial position of the vehicle.

6. The method for vision-aided navigation of claim 5, wherein obtaining test imagery from a vehicle is accomplished by acquiring the test imagery with at least one sensor as the vehicle travels along the pre-planned route of travel.

7. The method for vision-aided navigation of claim 1, further comprising:
    selecting reference imagery from the reference imagery database based, at least partially, on the acquired test imagery's metadata.

8. The method for vision-aided navigation of claim 7, wherein registering the test imagery against reference imagery from the reference imagery database is accomplished by utilizing EPC techniques.

9. The method for vision-aided navigation of claim 1, further comprising:
   updating a guidance system of the vehicle.

10. The method for vision-aided navigation of claim 9, further comprising:
   determining a correct match between the test image and the reference image with an Enhanced Phase Correlation (EPC) Verification Metric (VM); and
   determining an estimate of the accuracy of the registration with a registration error covariance estimation.

11. The method for vision-aided navigation of claim 10, wherein the method for vision-aided navigation further comprises:
   searching for a local azimuth angle relative to a nominal reference image; and
   registering reference imagery offset in an azimuth angle from the nominal reference image against the acquired test imagery, wherein registering reference imagery offset in an azimuth angle from the nominal reference image against the acquired test imagery is accomplished by utilizing EPC techniques.

12. The method for vision-aided navigation of claim 1, further comprising:
   solving misregistration errors by utilizing a sensor parameter search paradigm.

13. A method for vision-aided navigation comprising the steps of:
   acquiring an image frame from a sensor on a vehicle including a guidance system;
   selecting an ortho-rectified reference image from a reference imagery database;
   ortho-rectifying the acquired image frame;
   geo-registering the ortho-rectified acquired image frame against the ortho-rectified reference image;
   obtaining a correct registration solution, whereby the correct registration solution indicates that the ortho-rectified acquired image frame matches the ortho-rectified reference image;
   determining coordinates of a location at which the ortho-rectified acquired image frame was acquired;
   determining the vehicle's positional alignment error; wherein the vehicle's positional alignment error is based, at least partially, on the coordinates of a location of the ortho-rectified reference image;
   updating the vehicle's guidance system; and
   correcting the vehicle's motion.

14. The method for vision-aided navigation of claim 13, further comprising:
   utilizing Enhanced Phase Correlation (EPC) techniques to identify fiducials that persist across multi-temporal imagery; and
   creating the reference imagery database based, at least partially, on the identified fiducials.

15. The method for vision-aided navigation of claim 13, wherein selecting an ortho-rectified reference image from the reference imagery database is based, at least partially, on sensor metadata collected from the sensor on the vehicle.

16. The method for vision-aided navigation of claim 15, wherein geo-registering the ortho-rectified acquired image frame against the ortho-rectified reference image is accomplished by utilizing EPC techniques.

17. A non-transitory computer-readable medium storing a plurality of instructions which when executed by one or more processors causes the one or more processors to perform a method for vision-aided navigation, the plurality of instructions for the method for vision-aided navigation comprising:
   instructions for identifying fiducials that persist across multi-temporal imagery;
   instructions for creating a reference imagery database based, at least partially, on the identified fiducials;
   instructions for obtaining a test image from a vehicle;
   instructions for registering the test image against a reference image from the reference imagery database;
   instructions for obtaining a correct registration solution, whereby the correct registration solution indicates that the acquired test image matches the reference image;
   instructions for determining coordinates of a location at which the test image was acquired;
   instructions for estimating a position error of the vehicle; wherein the estimated position error is based, at least partially, on coordinates of a location of the reference image;
   instructions for correcting the position error of the vehicle; and
   instructions for guiding the vehicle based, at least partially, on the corrected error position.

18. The non-transitory computer-readable medium of claim 17, further comprising:
   instructions for generating a pre-planned route of travel for the vehicle, wherein the vehicle includes a guidance system; and wherein the identified fiducials are image patches of the reference imagery located along the pre-planned route of travel.

19. The non-transitory computer-readable medium of claim 17, further comprising:
   instructions for utilizing Enhanced Phase Correlation (EPC) techniques to identify the fiducials that persist across multi-temporal imagery;
   wherein registering the test image against the reference image is accomplished by utilizing EPC techniques; and
   wherein estimating a position error of the vehicle is accomplished by utilizing EPC techniques.

20. The non-transitory computer-readable medium of claim 17, further comprising:
   Instructions for selecting reference imagery from the reference imagery database based, at least partially, on the acquired test imagery's metadata.

* * * * *